(12) United States Patent
Koutyrine et al.

(10) Patent No.: US 7,448,028 B2
(45) Date of Patent: Nov. 4, 2008

(54) SYSTEM AND METHOD FOR SELECTIVE LOCAL OBJECT RETRIEVAL

(75) Inventors: Oleg Koutyrine, Sandhausen (DE); Yuvaraj Athur Raghuvir, Indiranagar (IN); Shilpa Airi, Bangalore (IN)

(73) Assignee: SAP AG, Walldorf (DE)

( * ) Notice: Subject to any disclaimer, the term of this patent is extended or adjusted under 35 U.S.C. 154(b) by 719 days.

(21) Appl. No.: 10/693,178

(22) Filed: Oct. 23, 2003

(65) Prior Publication Data

US 2005/0091185 A1 Apr. 28, 2005

(51) Int. Cl.
*G06F 9/45* (2006.01)

(52) U.S. Cl. ................................. 717/148

(58) Field of Classification Search .................. 717/148
See application file for complete search history.

(56) References Cited

U.S. PATENT DOCUMENTS

| 6,922,685 | B2 * | 7/2005 | Greene et al. ............... 707/1 |
| 2002/0174191 | A1 * | 11/2002 | Robertson et al. ........... 709/217 |
| 2002/0188538 | A1 * | 12/2002 | Robertson et al. ............. 705/35 |

* cited by examiner

*Primary Examiner*—John Chavis
(74) *Attorney, Agent, or Firm*—Kenyon & Kenyon LLP

(57) ABSTRACT

A method and system for selectively retrieving locally stored runtime objects in an application development environment. According to one embodiment, a generator fetches a requested runtime object from a locally stored set of runtime objects if the locally stored runtime object is valid, and fetches a server stored runtime object if the locally stored runtime object is invalid and the server stored runtime object is valid.

14 Claims, 26 Drawing Sheets

| Name | Object Type | Change Type | Owned |
|---|---|---|---|
| Y_ctrlmStreet_EN [Master] | Short Text | Modify | ☑ |
| Y_ctrlmPostCode_EN | Short Text | Modify | ☑ |
| Y_ctrlmCity_EN [Master] | Short Text | Modify | ☑ |
| Y_Customeraddress | Tile | Modify | ☑ |

SYSTEM AND METHOD FOR SELECTIVE LOCAL OBJECT RETRIEVAL

BACKGROUND OF THE INVENTION

In an object-oriented application development environment, application developers may model application behavior through the use of development objects, which may then be generated into corresponding runtime objects to be executed within an application framework. The runtime objects are generated according to the current generator state, which may be based on user-selected settings that define how the generation is to occur (e.g., whether to include additional debugging code or informational messages in log files, etc.).

When a developer makes changes to particular development objects or user settings, the developer usually requests a regeneration of the corresponding runtime objects in order to verify that the changes are correctly reflected in the corresponding runtime objects.

If particular corresponding runtime objects had been previously generated according to the state of their corresponding development objects and the current generator state, the application development environment would retrieve the runtime objects, rather than regenerate them from scratch.

However, current application development environments retrieve the previously generated runtime objects from a central server that stores information regarding the previously generated runtime objects' user settings. The retrieval can take much time, especially when the runtime objects are large.

Accordingly, there is a need in the art for a system and method that selectively retrieves from local storage those previously generated runtime objects that had been locally stored.

SUMMARY OF THE INVENTION

Embodiments of the present invention provide for selectively retrieving locally stored runtime objects in an application development environment. According to one embodiment, a generator retrieves a requested runtime object from a locally stored set of runtime objects if the locally stored runtime object is valid, and retrieves a server stored runtime object if the locally stored runtime object is invalid and the server stored runtime object is valid.

DETAILED DESCRIPTION

Overview

Figure 1:
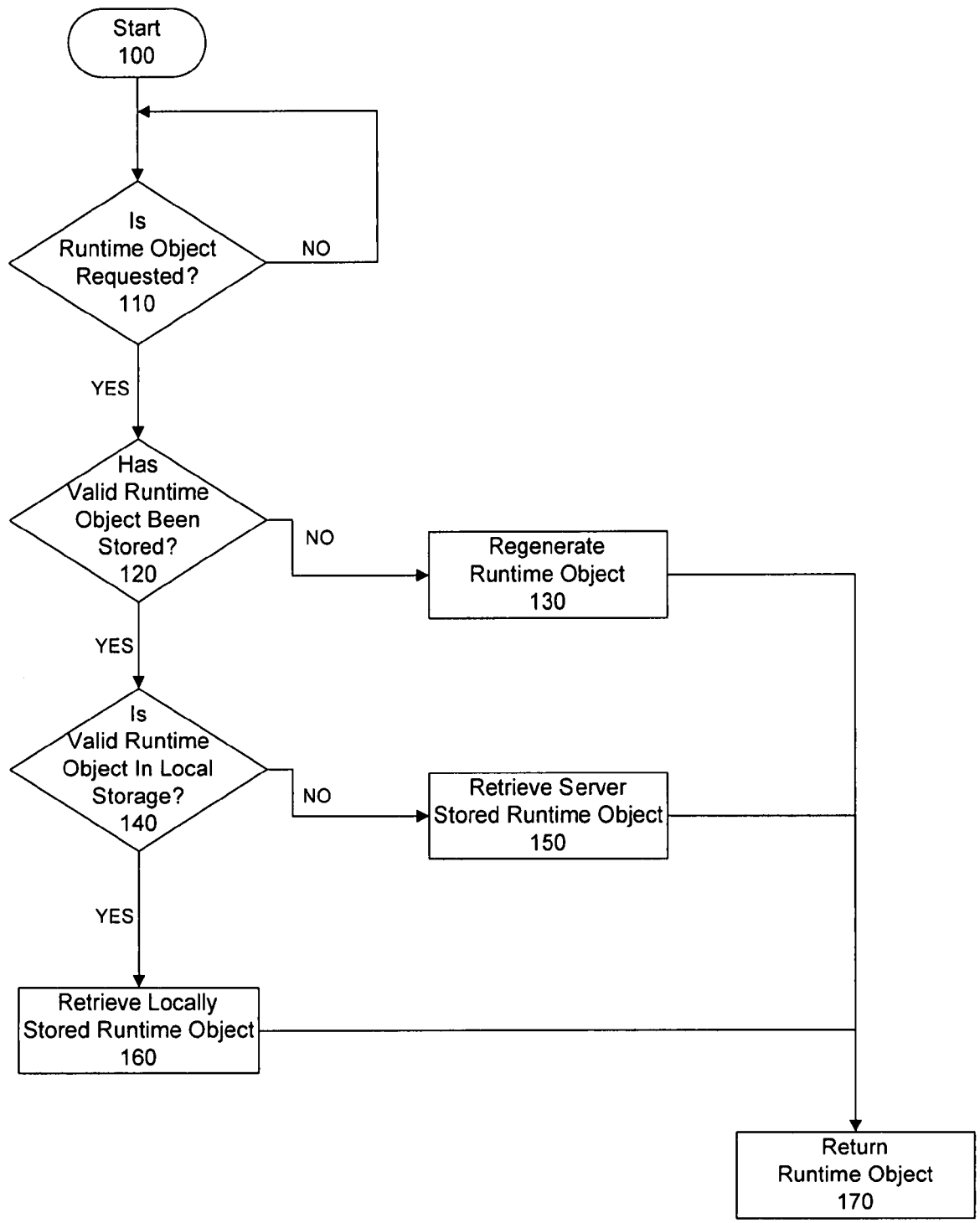
FIG. 1 is a flow chart that depicts a process for implementing local object retrieval in accordance with an embodiment of the present invention.

FIG. 1 depicts a process for implementing selective local object retrieval in accordance with an embodiment of the present invention. During application development runtime (step 100), when an application developer requests a runtime object (step 110), the method may determine whether the requested runtime object has been stored (step 120). If it has not been stored, the method may regenerate the runtime object (step 130). If it has been stored, the method may determine whether the local storage contains the requested runtime object (step 140). If it has not been locally stored, the method may retrieve the runtime object stored on the server side (step 150). If it has been locally stored, the method may retrieve the locally stored runtime object (step 160). Once the method, depending on the circumstances, regenerates or retrieves the requested runtime object, the method may provide the runtime object to the developer (step 170).

Embodiments described below illustrate an application development environment within which the present invention may be implemented.

Development Environment

Figure 2:
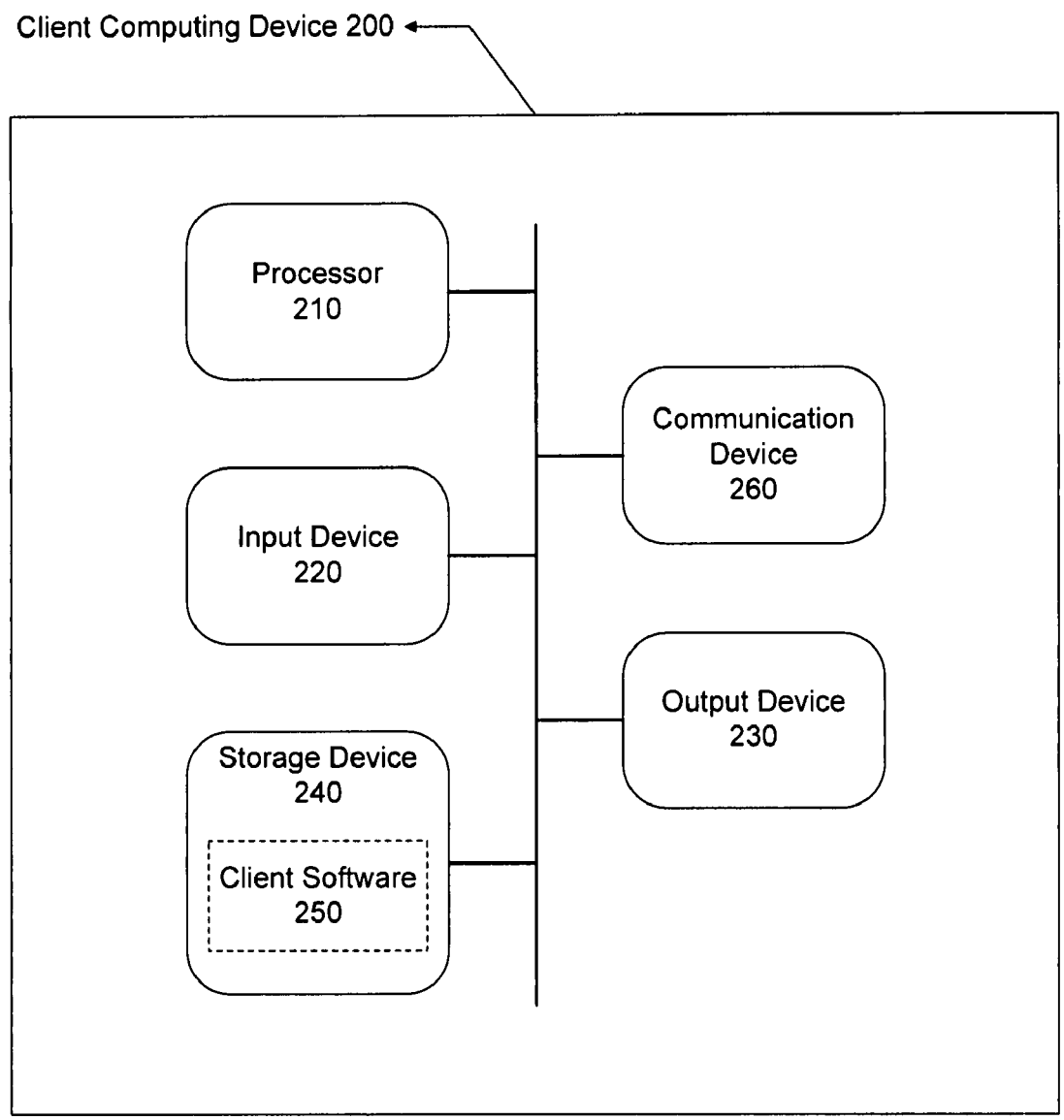
FIG. 2 is a block diagram that depicts a user computing device in accordance with an embodiment of the present invention.
Figure 3:
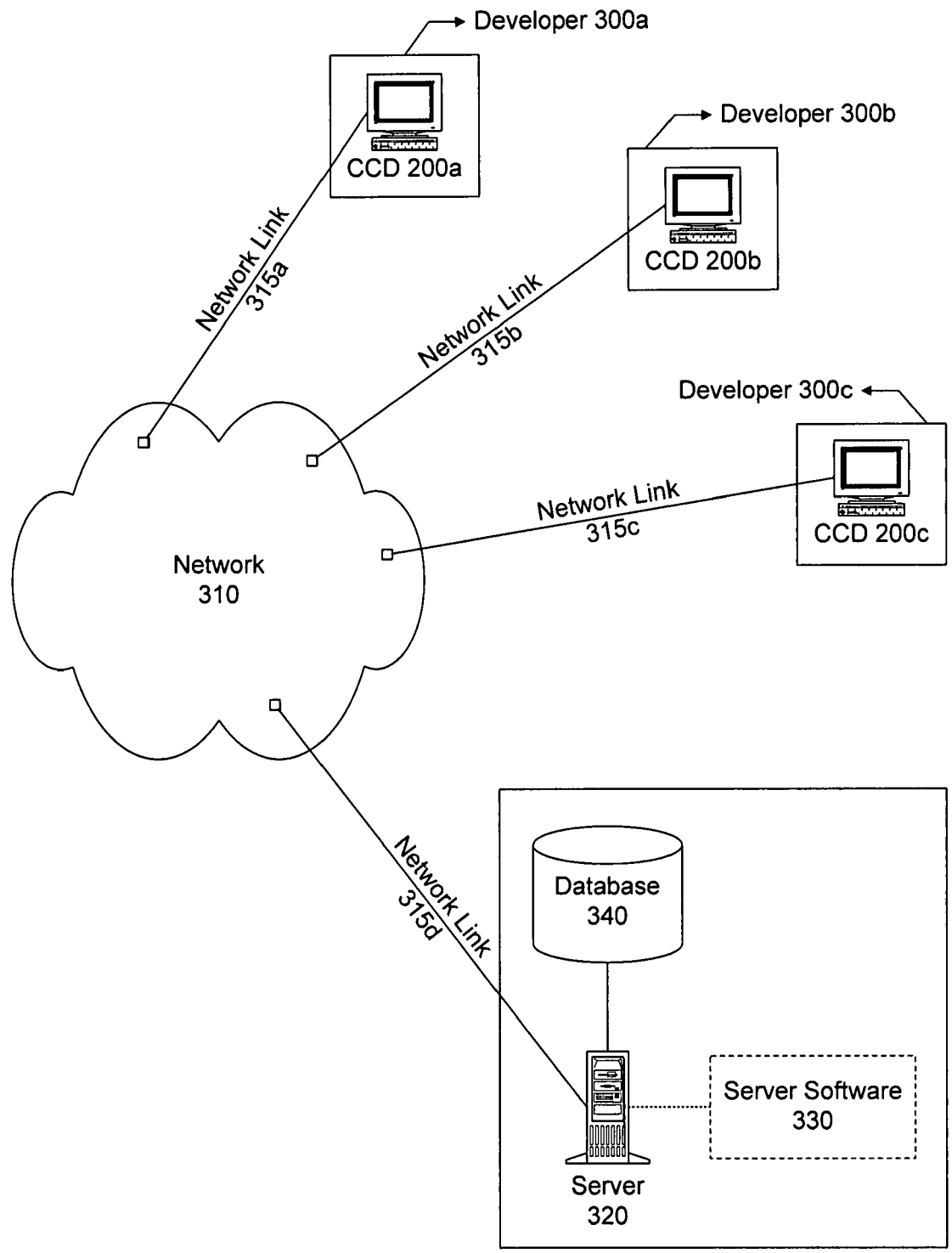
FIG. 3 is a block diagram that depicts a network architecture for a development environment in accordance with an embodiment of the present invention.

FIGS. 2 and 3 illustrate the components of a basic development environment in accordance with an embodiment of the present invention. FIG. 2 depicts client computing device 200, which may be a workstation, personal computer, handheld personal digital assistant ("PDA"), or any other type of microprocessor-based device. Client computing device 200 may include a processor 210, input device 220, output device 230, storage device 240, client software 250, and communication device 260.

Input device 220 may include a keyboard, mouse, pen-operated touch screen, voice-recognition device, or any other device that provides input from a user. Output device 230 may include a monitor, printer, disk drive, speakers, or any other device that provides output to user.

Storage device 240 may include volatile and nonvolatile data storage, including one or more electrical, magnetic or optical memories such as a RAM, cache, hard drive, CD-ROM drive, tape drive or removable storage disk. Communication device 260 may include a modem, network interface card, or any other device capable of transmitting and receiving signals over a network. The components of client computing device 200 may be connected via an electrical bus or wirelessly.

Client software 250 may be stored in storage device 240 and executed by processor 210, and may include, for example, the client side of a client/server application that embodies the functionality of the present invention.

FIG. 3 illustrates a network architecture for a development environment in accordance with an embodiment of the present invention. According to one particular embodiment, when developer 300a invokes a client software application, client software 250 of client computing device 200a communicates with server software 330 (e.g., the server side of the client/server application software) of server 320 via network link 315a, network 310, and network link 315d.

Network link 315 may include telephone lines, DSL, cable networks, T1 or T3 lines, wireless network connections, or any other arrangement that implements the transmission and reception of network signals. Network 310 may include any type of interconnected communication system, and may implement any communications protocol, which may secured by any security protocol.

Server 320 includes a processor and memory for executing program instructions, as well as a network interface, and may include a collection of servers. In one particular embodiment, server 320 may include a combination of enterprise servers such as an application server and a database server. Database 340 may represent a relational or object database, and may be accessed via a database server.

Client computing device 200 and server 320 may implement any operating system, such as Windows or UNIX. Client software 250 and server software 330 may be written in any programming language, such as ABAP, C, C++, Java or Visual Basic.

Repository Based Application Development

An embodiment of the present invention may be implemented through the use of a repository based application development environment. In this type of environment, application metadata is modeled (e.g., developed and tested) using an application repository, and then generated into a runtime application to be executed within its corresponding application framework.

Overview

An application framework provides core services and functionality common to any application that may run on the framework. An application may take the form of runtime files that extend the basic functionality of the framework in order to achieve individual application behavior. In order to recognize and execute the application, the framework defines a particular format to which the application is expected to conform. By distinguishing an application from its framework in this manner, application development can focus on high-level functionality rather than the low-level, and generally static, services and functionality provided by the framework.

Figure 4:
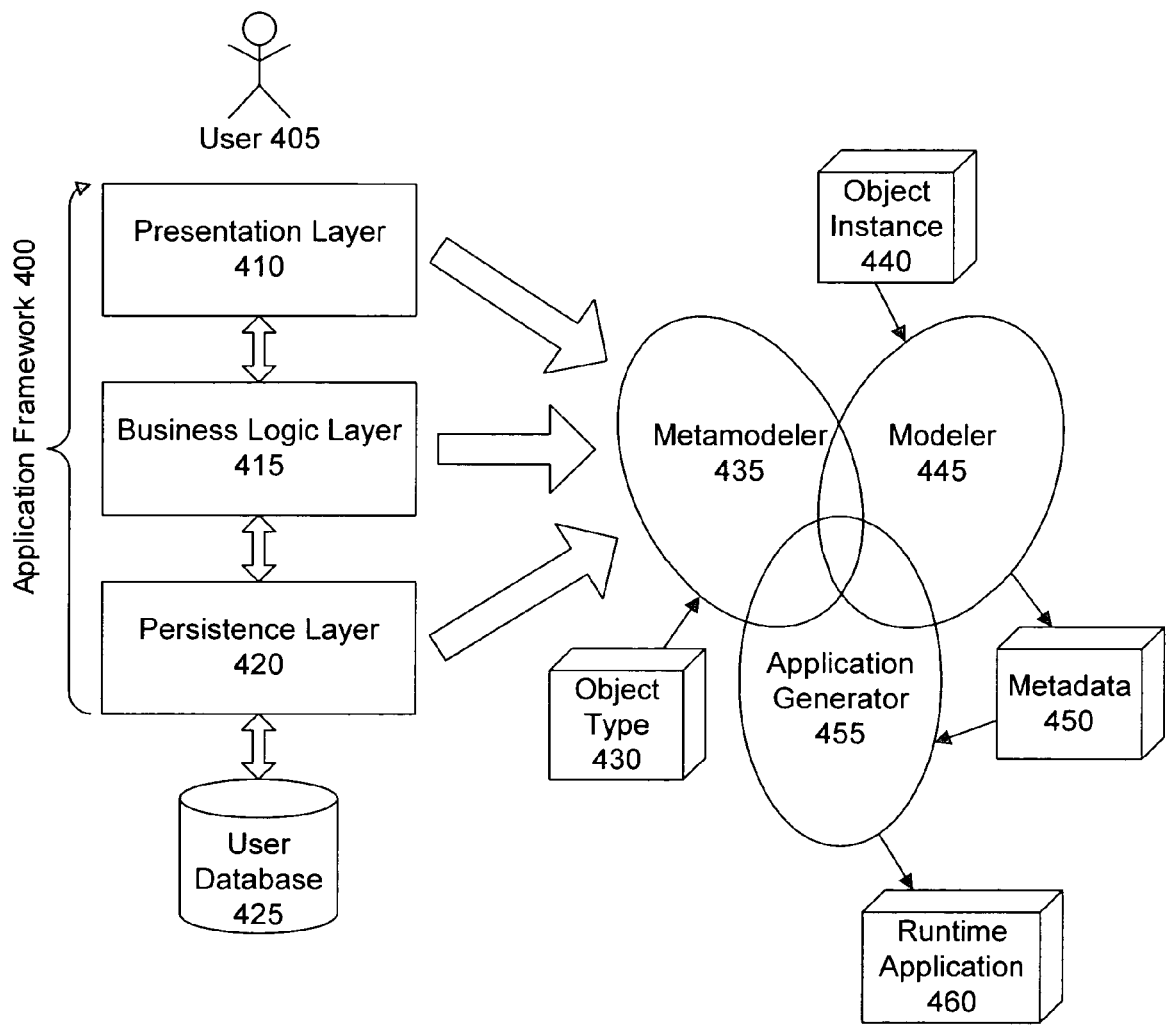
FIG. 4 is a block diagram that depicts modeling and generating an application development environment and corresponding applications that are compatible with an existing framework in accordance with an embodiment of the present invention.

In order for an application development environment to properly model and generate applications to run on an existing framework, the application development environment needs to have intimate knowledge of the framework architecture. The process of modeling and generating both an application development environment and the corresponding applications in conformance with an existing framework is illustrated in FIG. 4.

Application framework 400 may represent an existing object-oriented framework with a three-tier architecture: presentation layer 410, business logic layer 415 and persistence layer 420. Presentation layer 410 may provide a user interface to user 405, rendering data to and accepting data from user 405. Business logic layer 415 may act as a data provider to presentation layer 410, providing validation of user inputs and business rules, and other standard operations, such as save, delete, revert, etc. Persistence layer 420 may provide an abstraction over user database 425, providing an object-oriented wrapper over relational data stored in user database 425.

Modeler 445 and application generator 455 are part of a repository based application development environment that enables application developers to model and generate applications such as runtime application 460 to run on application framework 400. Since in this embodiment application framework 400 represents an object-oriented framework, application framework 400 defines a particular object format to which it expects runtime application 460 to conform. This object format is developed into modeler 445 and application generator 455 so that they may correctly model and generate runtime application 460. Metamodeler 435 provides a modeling (or, more specifically, metamodeling) environment that enables framework developers to specify the object format of application framework 400 to be developed into modeler 445.

Thus, framework developers use metamodeler 435 to specify the type of objects (i.e., object type 430) defined by application framework 400. This object type information is used to generate and develop modeler 445, which is used by application developers to specify instances of these object types (i.e., object instance 440) in the development and testing of an application's metadata (i.e., metadata 450). Once the development and testing of metadata 450 is complete, application generator 455 generates metadata 450 into runtime application 460 for execution within application framework 400.

Transformation Between Application Metalevels

This repository based development environment can be described using the OMG Meta Object Facility (MOF) architecture. The MOF is a 4 layer meta data architecture described as follows:

The user object layer (M0) is comprised of the information that one wishes to describe. This information is typically referred to as data.

The model layer (M1) is comprised of the metadata that describes information. Metadata is informally aggregated as models.

The metamodel layer (M2) is comprised of the descriptions (i.e. meta-metadata) that define the structure and semantics of meta-data. Meta-metadata is informally aggregated as metamodels. A metamodel can also be thought of as a modeling language (e.g., UML is defined by a metamodel) for describing different kinds of data.

The meta-metamodel layer (M3) is comprised of the description of the structure and semantics of meta-metadata. In other words, it is the language for defining different kinds of metadata. The OMG MOF specification contains a standardized meta-metamodel which is designed to support the definition of different kinds of modeling languages like UML, IDL etc.

Figure 5:
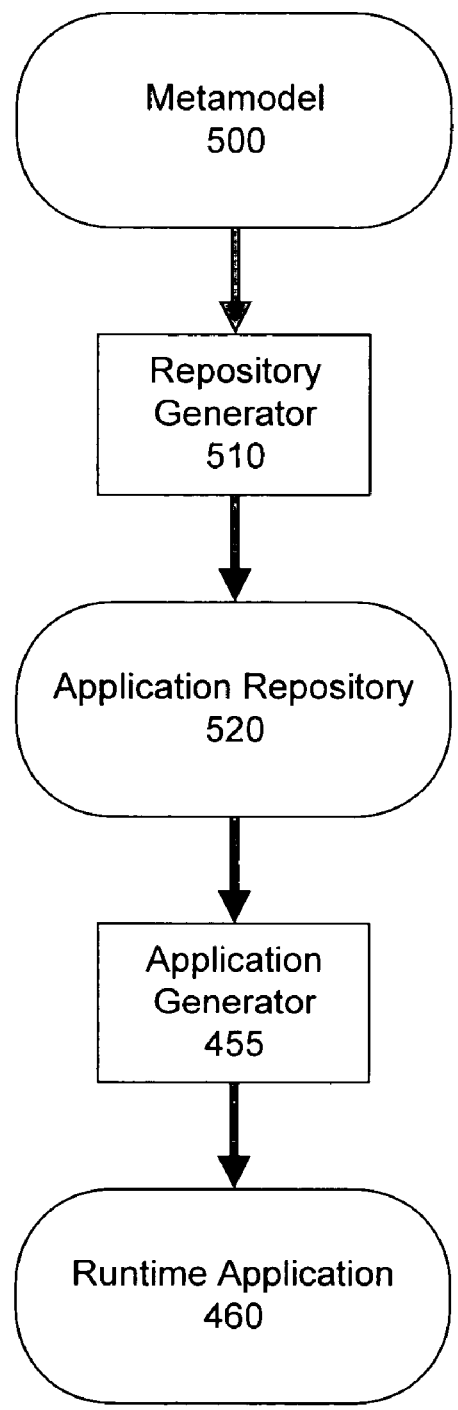
FIG. 5 is a block diagram that depicts the metalevels of repository based application development using the OMG Meta Object Facility (MOF) architecture in accordance with an embodiment of the present invention.

FIG. 5, for example, metamodel 500 (the M2 layer) represents the object types supported by application framework 400 that are specified by framework developers using metamodeler 435. Repository generator 510 uses metamodel 500 to generate framework-specific parts of application repository 520 (the M1 layer), which represent an object repository (i.e., database structure) and corresponding object navigational interface that are accessed by application developers via modeler 445 in the development and testing of metadata 450. Application generator 455 generates metadata 450 into runtime application 460 (the M0 layer) for execution within application framework 400. The M3 layer is not applicable to the current description of the repository based development environment.

Modeler

FIGS. 6-11 illustrate modeling screens and changelist management employed by modeler 445 in accordance with an embodiment of the present invention.

Modeling Screens

Figure 6:
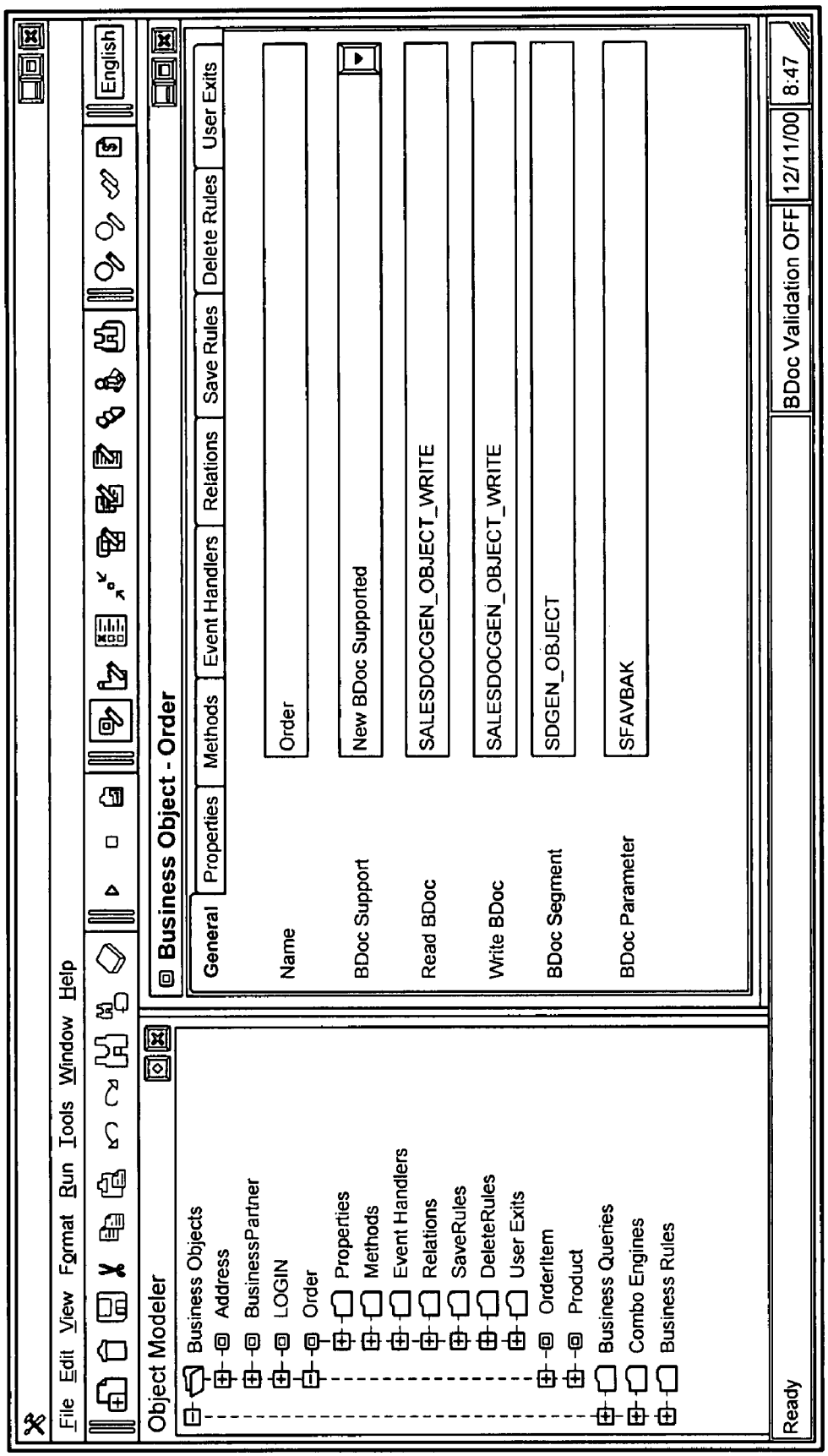
FIG. 6 is a screen shot of an object browser for modeling business objects in accordance with an embodiment of the present invention.
Figure 7:
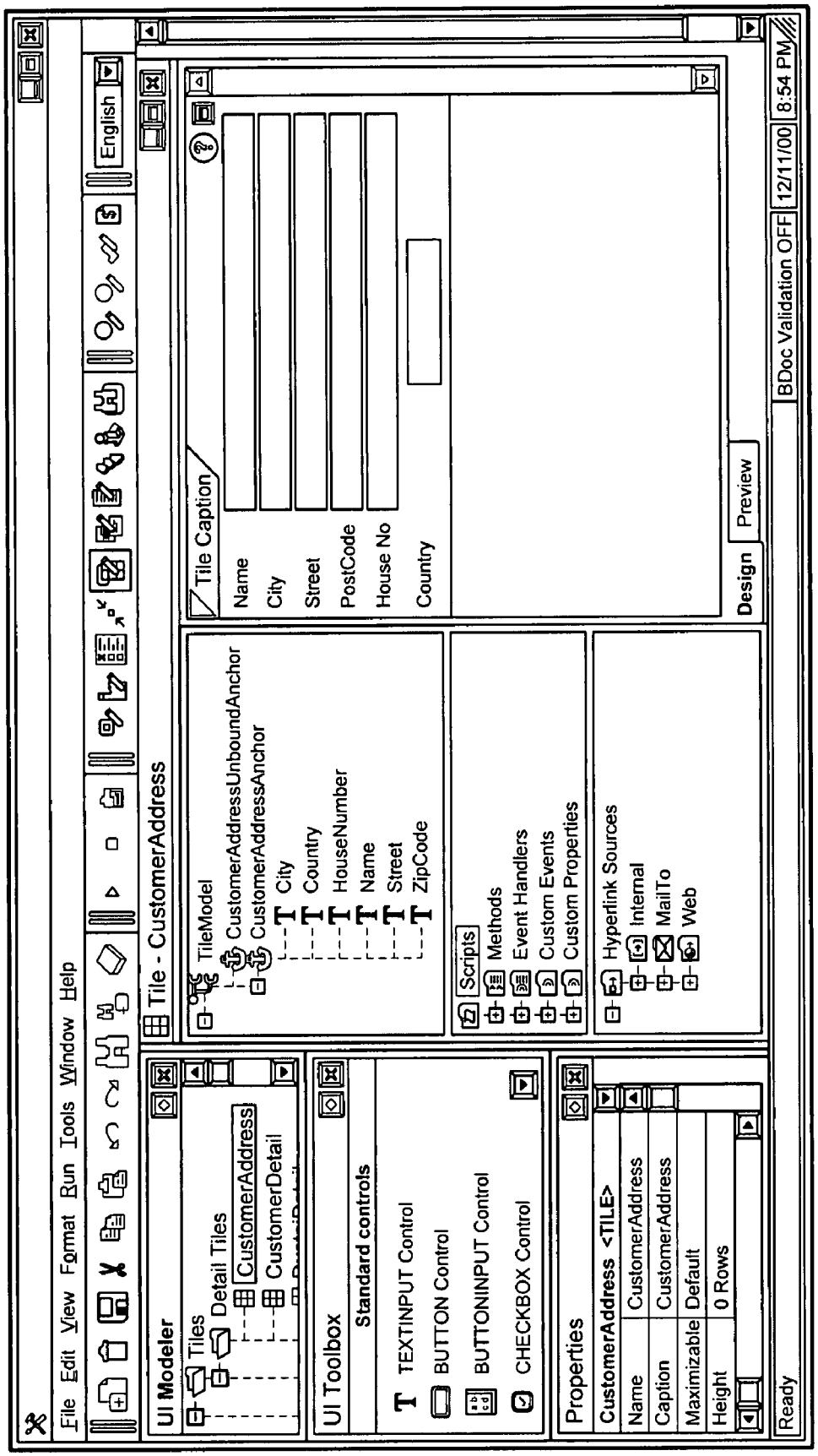
FIG. 7 is a screen shot of an object browser for modeling user interface elements in accordance with an embodiment of the present invention.

As shown in FIGS. 6 and 7, modeler 445 employs an object browser to enable application developers to view a hierarchical display of development objects to be generated into runtime application 460, and to model development objects for business logic layer 415 (FIG. 6) and presentation layer 410 (FIG. 7) of runtime application 460. A similar modeling environment may be employed to model development objects for persistence layer 420.

As an example, application framework 400 may define a business object type to represent the business logic for business logic layer 415 of runtime application 460. In the business world, one may wish to model a sales organization that offers products or services to various customers. Since the organization would need to store information on its customers and decide how to offer its products or services in different market segments, a business object could represent customers, contact persons, products, sales opportunities, sales activities and sales promotions.

A development object in modeler 445 may model each of the above business objects. For purposes of this discussion, although the term "object" may either refer to a class (i.e., object type 430) or an instance of a class (i.e., object instance 440), the term "object" is generally meant to portray an instance of a class, while the term "object type" is generally meant to portray the class itself.

Thus, as shown in the "Object Modeler" sub-window in FIG. 6, an application developer has modeled several development objects (e.g., "Address", "BusinessPartner", "LOGIN", "Order", "OrderItem" and "Product") representing business objects. Since application framework 400 has also defined attributes for a business object, modeler 445 provides those attributes (e.g., "Properties", "Methods", "Event Handlers", "Relations", "SaveRules", "DeleteRules" and "UserExits") for development as shown under the "Order" object in the "Object Modeler" sub-window in FIG. 6. The application developer develops the attributes for the business object "Order" using the "Business Object—Order" sub-window in FIG. 6.

For example, the "Properties" attribute may represent the attributes of an entity of a real business world, such as a Sales Order object having properties like order number, order date, quantity. The "Methods" attribute may perform specific operations to manipulate data, such as a Sales Order object having a method to calculate and get the line items total. The "Event Handlers" attribute may describe a specific action that can occur against pre-defined events. The "Relations" attribute may define the interaction between different development objects based on business logic, such as a customer being associated to one or more sales orders. Business rules (e.g., the "SaveRules", "DeleteRules" and "UserExits" attributes) may validate the object data for consistency, such as allowing the creation of a rule for the Sales Order object to check if the range of the order amount is consistent.

FIG. 7 illustrates a similar modeling screen for UI objects, as defined by application framework 400, to represent the screen elements for presentation layer 410 of runtime application 460. As shown in the "UI Modeler" sub-window in FIG. 7, an application developer has modeled several development objects (e.g., "CustomerAddress", "CustomerDetail", etc.) representing tiles, which are UI objects similar to frames or sub-windows. The application developer develops the UI object "CustomerAddress" using the "Tile—CustomerAddress" sub-window in FIG. 7.

Changelist Management

As stated above, modeler 445 uses application repository 520 in the development and testing of metadata 450. The framework-specific parts of application repository 520 represent an object repository and corresponding object navigational interface that provide for the storage and access of the development objects by modeler 445. Due to the importance of tracking changes in a parallel and distributed development environment, application developers may operate on a development object via changelists, which allow the developers to maintain different versions of the development object in the object repository. This provides isolation of work in a multi-user development environment, as depicted in FIG. 3.

Figure 8:
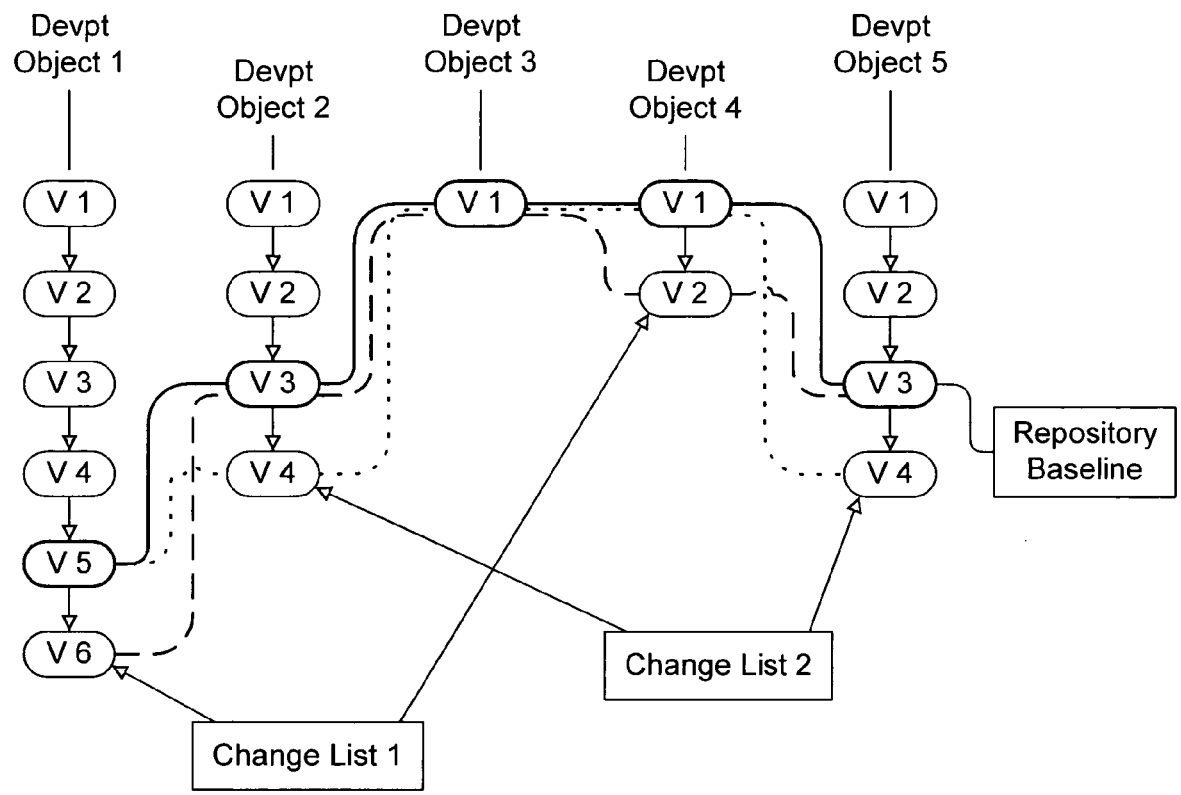
FIG. 8 is a block diagram that depicts changelist management in accordance with an embodiment of the present invention.
Figure 9:
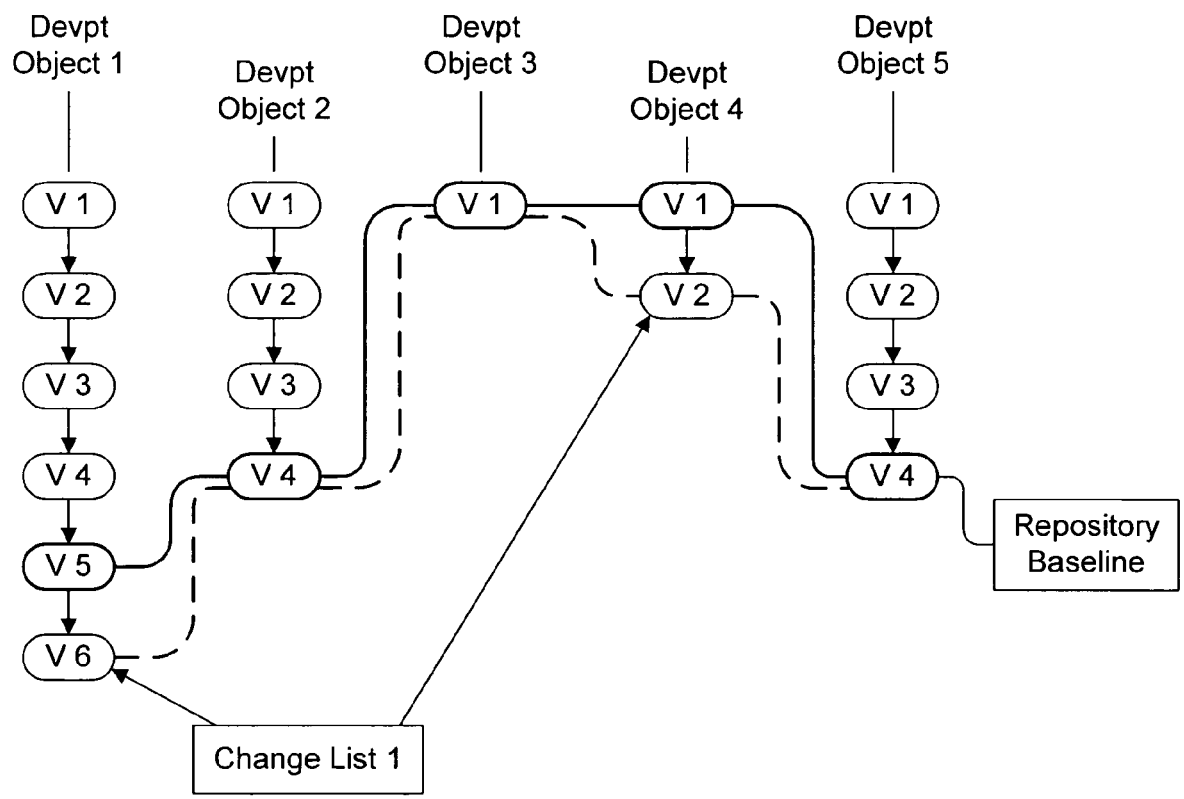
FIG. 9 is a block diagram that depicts changelist management in accordance with an embodiment of the present invention.

A changelist is a collection of open versions of new or existing development objects that are derived from the repository baseline. The repository baseline specifies the current closed version of a development object in the object repository. As illustrated in FIG. 8, the repository baseline includes version 5 of development object 1, version 3 of development object 2, version 1 of development objects 3 and 4, and version 3 of development object 5. Since a first application developer is working on development objects 1 and 4, the first developer's changelist includes version 6 of development object 1 and version 2 of development object 4. Since a second application developer is working on development objects 2 and 5, the second developer's changelist includes version 4 of development object 2 and version 4 of development object 5. As illustrated in FIG. 9, when the second developer releases her changelist to the baseline, version 4 of development objects 2 and 5 become part of the new repository baseline that is now available for development and testing by other developers.

Figures 10, 11:
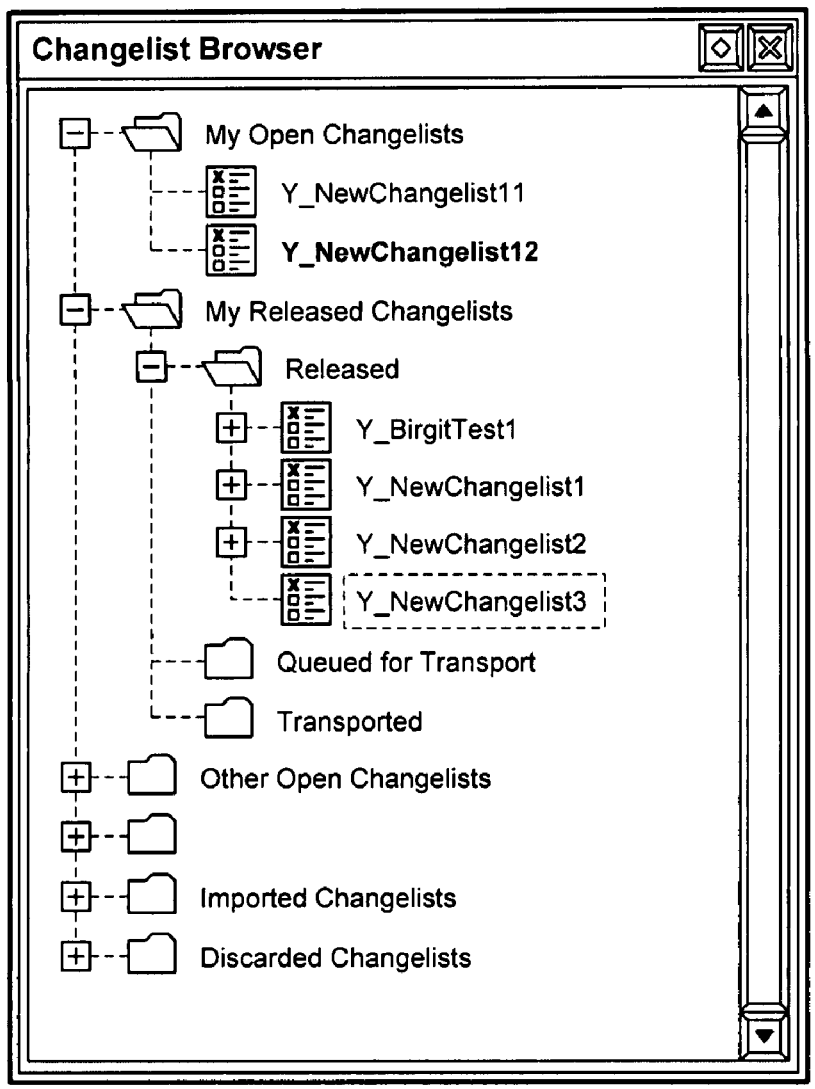
FIG. 10 is a screen shot of a changelist browser in accordance with an embodiment of the present invention.
FIG. 11 is a screen shot of a particular changelist in accordance with an embodiment of the present invention.

An application developer may manage changelists through a changelist browser, as shown in FIG. 10, which keeps track of both open and released changelists of the developer and others. The selection of a particular changelist, such as "Y_NewChangelist3" in the changelist browser in FIG. 10, may bring up an additional window describing the details of the development objects in that changelist, as shown in FIG. 11.

Modeler 445 may include known configuration management tools to handle version management issues such as branching, collisions, etc. when developers work on the same development objects at the same time.

Incremental Generation Bases on Invalidation Rules

Within a repository based application development environment, such as the one described above, an embodiment of the present invention may be implemented to enable application generator 455 to generate only those elements of runtime application 460 that have been invalidated through rule-based navigation. The implementation of invalidation rule based generation depends upon the structure of and relationship between metadata 450 and runtime application 460.

Overview

Figure 12:
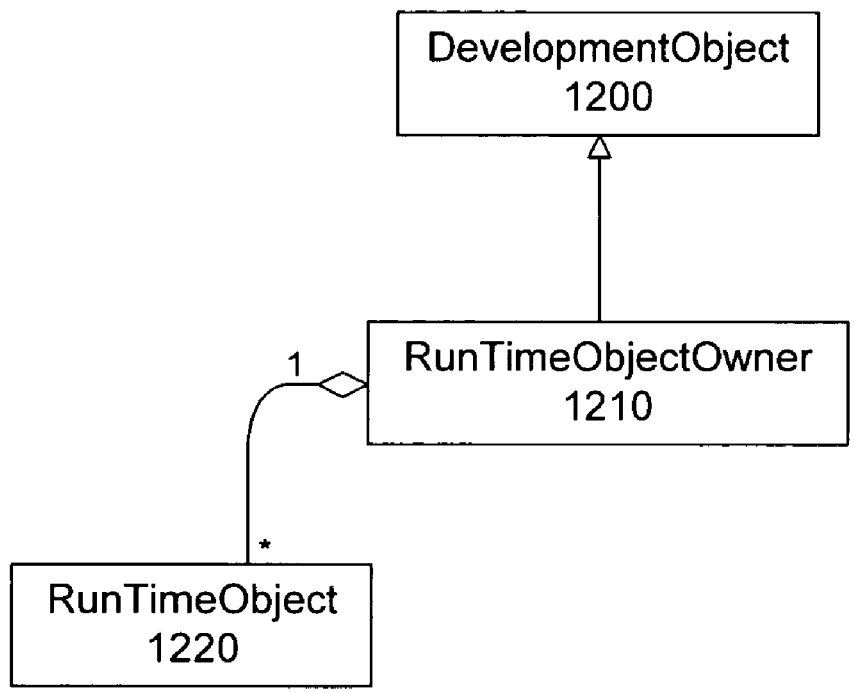
FIG. 12 is an abstract object repository model in accordance with an embodiment of the present invention.

According to one embodiment of the present invention, the structure of metadata 450 and runtime application 460 may be represented in the object repository of application repository 520 based on the abstractions illustrated in the object repository model of FIG. 12. Development objects (Development Object 1200) represents the class of metadata 450, which is the pre-generation data representation of the development objects as modeled by application developers in modeler 445. This data representation, for example, could take the form of database tables wherein in each table represents a development object type, each column represents a particular development object and each row represents the attributes of a particular development object. Runtime objects (RunTime Object 1220) represent the class of runtime files of runtime application 460 that are generated from the development object metadata to be executed by application framework 400. Examples of runtime files could be binary files, JAVA class files and HTML layout files. In this particular model, development objects are classified as main development objects (RunTimeObjectOwner 1210) if they are top level objects associated with runtime objects.

Figure 13:
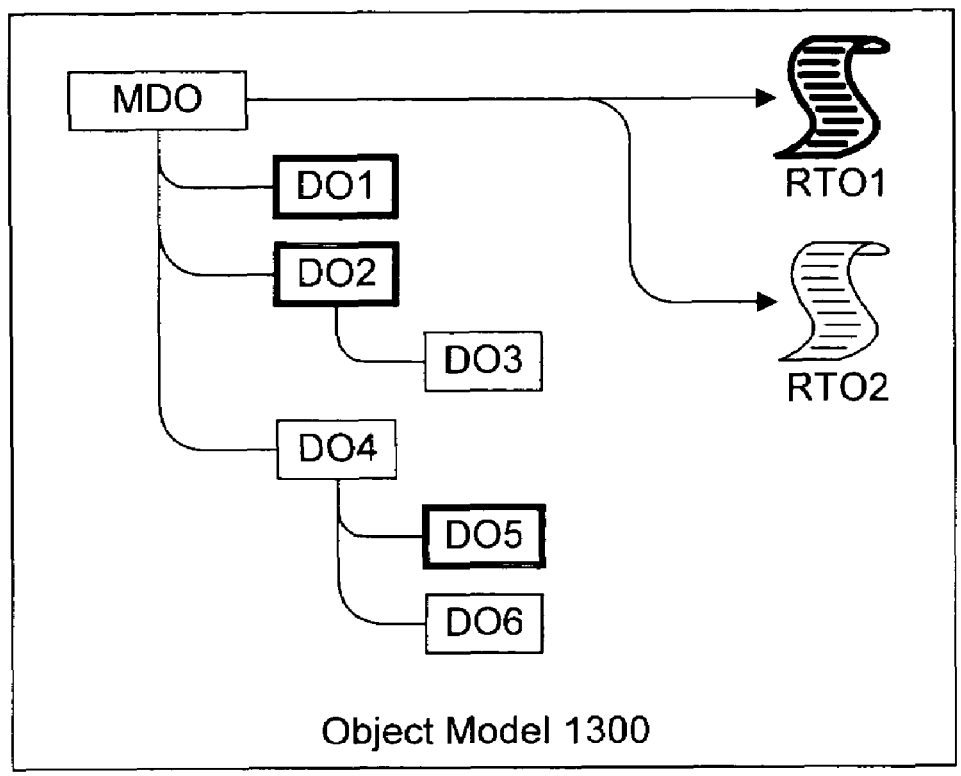
FIG. 13 is an general framework object model in accordance with an embodiment of the present invention.

FIG. 13 illustrates a general framework object model (object model 1300) that may be defined by a framework developer based on the object repository model of FIG. 12. In FIG. 13, the framework designer creates MDO to represent a main development object type, and DO1 through DO6 to represent children development objects types associated with MDO. Runtime object types RTO1 and RTO2 are associated with MDO, since MDO is the top-level object in accordance with the object repository model of FIG. 12.

Based on the requirements of application framework 400 and application generator 455 as defined by a framework developer, each runtime object type may only be influenced or affected by changes in a particular set of development object types. For example, during the modeling of specific instances of the framework object types of FIG. 13 in modeler 445, changes made to development objects of types MDO, DO1, DO2 and DO5 may influence the associated runtime object of type RTO1, while changes made to development objects of types MDO, DO3, DO4 and DO6 may influence the associated runtime object of type RTO2. These relationships may be formalized into a set of invalidation rules in advance of any application development, and can be used during application development to invalidate only the influenced runtime objects of a particular changed development object, so that application generator 455 only has to regenerate the invalidated runtime objects instead of all runtime objects.

Navigation Grammar Based on Object Semantics

The invalidation rules may be formalized with an object navigation grammar in accordance with an embodiment of the present invention. For example, an object navigation grammar could define a navigation path through the object repository of application repository 520, starting from a changed development object and ending at that development object's main development object, which is associated with the runtime object that is influenced by the changed development object.

For example, the framework developer who created object model 1300 could formalize the associated invalidation rules as mentioned above using the following grammar:

RTO1 Invalidation Rules

AnyChange=>DO5.parent.parent:{RTO1}

AnyChange=>DO2.parent:{RTO1}

AnyChange=>DO1.parent:{RTO1}

RTO2 Invalidation Rules

AnyChange=>DO6.parent.parent:{RTO2}

AnyChange=>DO4.parent:{RTO2}

AnyChange=>DO3.parent.parent:{RTO2}

Using the first RTO1 invalidation rule as an example, the object navigation grammar defines:

the type of change required to fire the rule (e.g., "AnyChange"), the starting object type in the navigation path (e.g., "DO5"), the navigation path via role names (e.g., ".parent.parent"), and the type of the resultant runtime object that requires invalidation (e.g., "{RTO1}").

Based on these rules, if a development object of type DO2 were changed by an application developer in modeler 445, the following of the above invalidation rules could be applied to determine which runtime objects are influenced by the changed DO2 development object:

AnyChange=>DO2.parent:{RTO1}

AnyChange=>DO3.parent.parent:{RTO2}

The first of these rules is applied because the starting object type of the rule (DO2) is that of the changed DO2 development object. This first rule thus specifies that the RTO1 runtime object associated with the parent of the changed DO2 development object should be invalidated. The second of these rules is applied because DO2 is in the navigation path of DO3 (i.e., DO2=DO3.parent), and thus the rule specifies that the RTO2 runtime object associated with the parent of the changed DO2 development object (i.e., DO2.parent=DO3.parent.parent) should be invalidated. This second rule is applied because a corresponding DO3 development object associated with the changed DO2 development object could have also been changed due to the change in the DO2 development object. For instance, the DO2 development object could have replaced its associated DO3 development object with a different DO3 development object, thus requiring invalidation of the changed DO2 development object's influenced RTO2 runtime object. If, in actuality, there is no corresponding DO3 development object associated with the changed DO2 development, the rule merely specifies an unnecessary, but rather harmless, invalidation.

Figure 14:
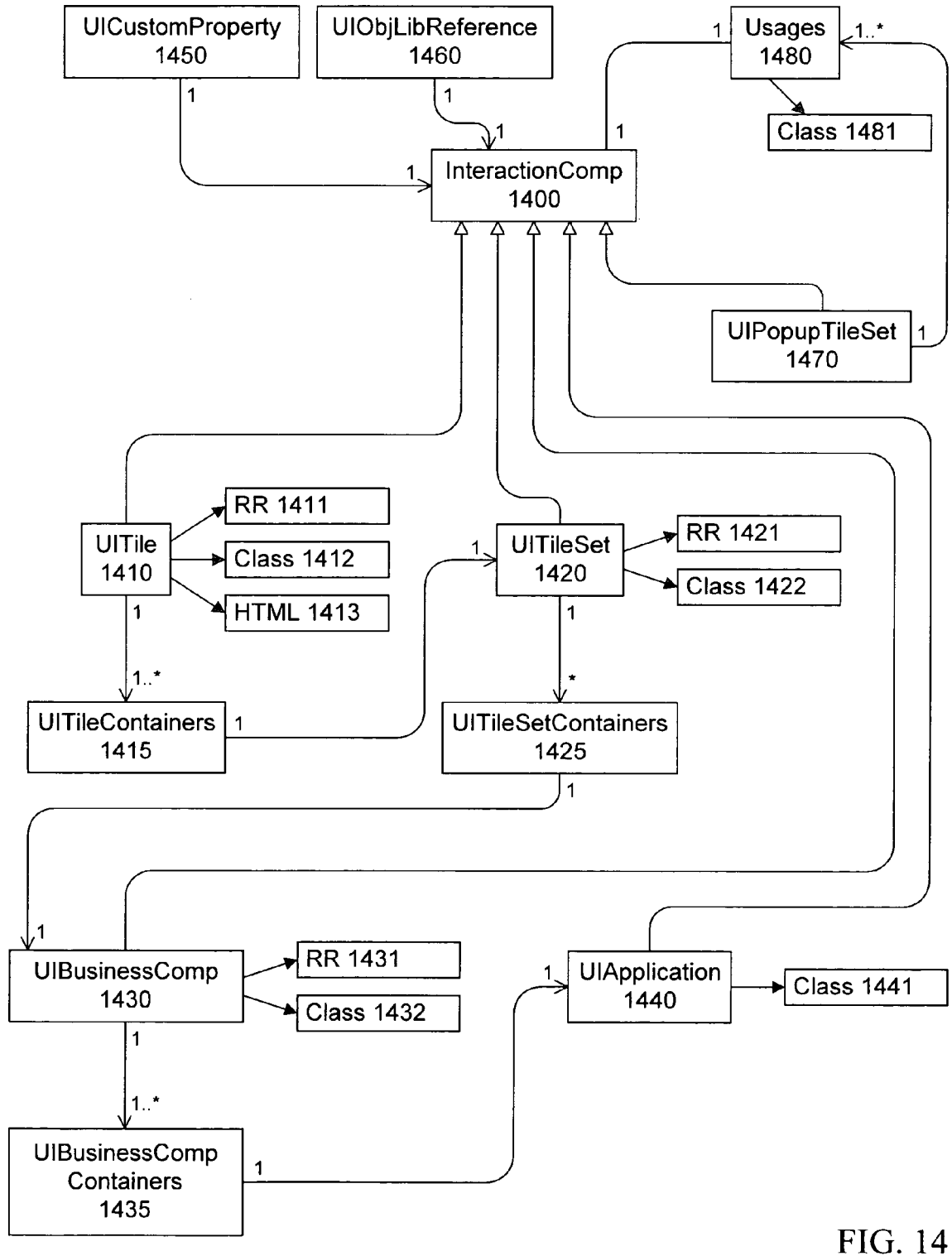
FIG. 14 is a detailed framework object model in accordance with an embodiment of the present invention.

The actions that may be specified by this object navigation grammar can be further illustrated with respect to the more detailed framework object model of FIG. 14, which may represent the types of development objects to be used for modeling presentation layer 410 of runtime application 460. Each object in FIG. 14 is a development object type, except for the main development object types UITile 1410 (and it's corresponding runtime object types RR 1411, Class 1412 and HTML 1413), UITileSet 1420 (and it's corresponding runtime object types RR 1421 and Class 1422), UIBusinessComp 1430 (and it's corresponding runtime object types RR 1431 and Class 1432), UIApplication 1440 (and it's corresponding runtime object type Class 1441), and Usages 1480 (and it's corresponding runtime object type Class 1481). The RR runtime objects may refer to binary files. The grammar may specify:

navigation to associated object or associated collection, specified by "."
The cardinality of the relation can be 1 or many. For example:
a. navigation to associated object with cardinality 1 may be specified as:

UIObjLibReference.InteractionComp b. navigation to associated object with cardinality more than one may be specified as:

UITileset.UITilesetContainers downcasting a pointer of an object to its sub class, specified by enclosing the class to be cast to in "[ ]"
For example:

InteractionComp[UITile]                              a.

InteractionComp[UITileset]                           b.

upcasting a pointer of an object to its super class, specified by enclosing the class to be cast to in "[^]"
For example:

UIBusinessComp[^InteractionComp]                     a.

repeating any of the above operations or sets of operations zero or more number of times, specified by enclosing them in "( )*"
For example:

UICustomProperty.(InteractionComp[UIPopup-Tileset].Usages)*     a.

the runtime object to be invalidated, specified in "{ }" following "::"
There could be more than one runtime object to be invalidated. More than one runtime object can be specified in "{ }" separated by comma. For example:

UITile::{class,HTML}                                 a.

UITileset::{class,RR}                                b.

the change type that will trigger the firing of a particular invalidation rule, specified by prefixing the rule with '<change type>=>' where the <change type> can be one of the following: 'Create', 'Add', 'Modify', 'Delete'
For example:

modify=>UICustomProperty.(InteractionComp[UI-PopupTileset].Usages)*::{class}     a.;

language dependent rules and runtime objects
The grammar may handle language dependency at two levels. Firstly, a rule itself may be specified as a language dependent/independent rule and secondly, the runtime object which has language dependency can further define the scope of invalidation with respect to language. The languages on which the rule or the runtime object is dependent may be specified in "<>" separated by commas. For example:

modify=><EN>Parent[UITile]::{HTML<EN,DE>, class>}     a.

Here the HTML runtime object needs to be invalidated in EN and DE languages. Class needs to be invalidated but it is language independent.
"HTML<LANG*>" would specify all languages.

predicates to be evaluated to resolve ambiguous object constructions
In some cases, an invalidation rule should specify information beyond a simple navigation path in order to allow efficient use of the rule. For example, this additional information may be used to evaluate the context of objects that may have ambiguous constructions in the associated object model. For instance, the following two relations may be defined between a tile object and a text object:

| Object Type(Role) | (Role)Object Type |
|---|---|
| Tile(parent) | (caption)Text |
| Tile(parent) | (status)Text |

Since the tile object type has the same role name for both relations, an invalidation rule for a caption text would be indistinguishable from an invalidation rule for a status text, namely "anychange=>Text.parent . . . ". Thus, in order to avoid unnecessary invalidations, an additional meta rule may be specified that would allow one to disambiguate an object construction so that a determination can be made as to which rule should be fired. For example:

modify=><EN><<LanguageText.Parent[UITile].Caption>>LangText.Parent[UITile]:: {HTML<EN>}a.

The part of the rule, such as <<LanguageText.Parent [UITile].Caption>> is known as a meta rule that helps in disambiguation and determining which rule has to be fired. Without this metarule, every rule with a text object type not associated with a caption may have been needlessly fired, possibly causing great inefficiencies.

several invalidation rules combined together

For example, modification of UICustomProperty 1450 of InteractionComp 1400 (which could be any of UITile 1410, UITileset 1420, UIBusinessComp 1430 and UIApplication 1440) may require invalidating the class file of the corresponding interaction component. The rules to specify are:

modify=>UICustomProperty.InteractionComp
 [UITile]::{class}"

modify=>UICustomProperty.InteractionComp
 [UITileset]::{class}"

modify=>UICustomProperty.InteractionComp[UI-
 BusinessComp]::{class}"

modify=>UICustomProperty.InteractionComp[UIAp-
 plication]::{class}"

The above rules could be clubbed together as:

modify=>UICustomProperty.InteractionComp[UITile,
 UITileset, UIBusinessComp,UIApplication]→
 {class}"

When UICustomProperty 1450 changes, this rule would be interpreted to invalidate the class file of the corresponding InteractionComponent 1400, which could be any of UITile 1410, UITileset 1420, UIBusiness-Comp 1430 and UIApplication 1440.

Rule Objects

Figure 15:
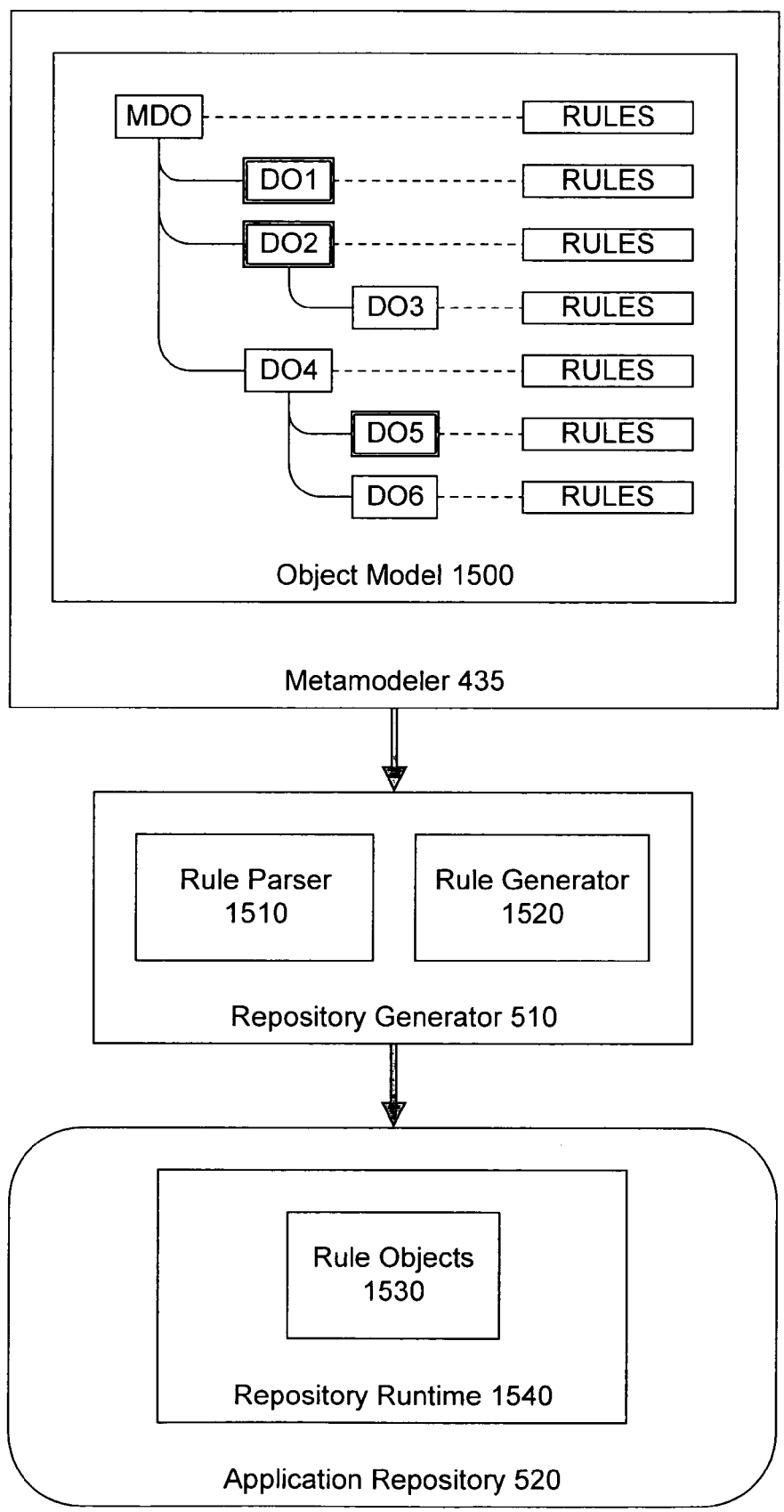
FIG. 15 is a block diagram that depicts the generation of invalidation rules into application repository in accordance with an embodiment of the present invention.

FIG. 15 illustrates how navigation grammar based invalidation rules may be generated into the runtime of application repository 520 for runtime execution. Initially, a framework developer defines in metamodeler 435 an invalidation rule for each framework object type in object model 1300 that is relevant with respect to a corresponding runtime object to be generated. This could be implemented in one particular embodiment by adding property pages to the specification of certain UML elements in the Rational Rose modeling software. Repository generator 510 may then extract the object model 1500 information from metamodeler 435 and dump it into an XML file for subsequent processing.

Grammar Completion

Before dumping the invalidation rules into an XML file for further processing, repository generator 510 may first create rule parser 1510 so that syntactic correctness of the invalidation rules may be enforced. Repository generator 510 may create rule parser 1510 by first completing a framework-specific grammar file. This can be accomplished by incorporating information such as class names and role names from object model 1500 (e.g., from the Rational Rose .mdl file) into a generic grammar file based on the above-described grammar specification.

In order to illustrate a generic grammar file according to object model 1500, the following relations are presumed to be defined in object model 1500:

| Object Type(Role) | (Role)Object Type |
|---|---|
| MDO(parent) | (child1)DO1 |
| MDO(parent) | (child2)DO2 |
| MDO(parent) | (child3)DO4 |
| DO2(parent) | (child21)DO3 |
| DO4(parent) | (child31)DO5 |
| DO6(parent) | (child32)DO6 |

Thus, the following represents the contents of a generic grammar file based on object model 1500 in accordance with an embodiment of the present invention:

```
rule_spec!:
    change_type
    IMPLIES
    {lang_spec}
    {METARULEBEGIN cls METARULEEND}
    invalidation_rule
    ;
change_type!:
    "modify"
    |"add"
    |"delete"
    |"create"
    "AllChanges"
    ;
invalidation_rule!:
    cls
    SCOPEOP
    rto_list
    ;
lang_spec!:
    LANGLEBRACK
    (language
    |LANG STAR)
    RANGLEBRACK
    ;
rto_list!:
    LCURLY
        rto_spec
        (COMMA rto_spec)*
    RCURLY
    ;
rto_spec!:
    rto_type {lang_spec}
    ;
cls!:
    (fw_class_list)
    (operation)*
    ;
repetition_operator!:
    STAR
    | PLUS
    ;
operation!:
    (navigation
    |cast)
    ;
navigation!:
    DOT
    (
    LPAREN (fw_role_attrib_list) (operation)*
    last_recur_nav repetition_operator
    |(fw_role_attrib_list)
    )
    ;
last_recur_nav!:
    DOT
    (fw_role_attrib_list)
    RPAREN
    ;
cast!:
    (upcast
    |downcast
    )
    ;
upcast!:
    LBRACKUP
    fw_class_list (COMMA fw_class_list)*
    RBRACK
    ;
downcast!:
    LBRACKDOWN
    fw_class_list
    (COMMA fw_class_list)*
    RBRACK
    ;
//=================================================
```

-continued

```
//the following production rules are to be generated
lang_dep_rto_types!:
    ("HTML"
    |"Prj")
    lang_spec
    ;
lang_indep_rto_types!:
    "class"
    |"list"
    ;
rto_type!:
    lang_dep_rto_types
    |lang_indep_rto_types
    ;
language!:
    "EN"
    |"DE"
    ;
fw_class_list!:
    (fw_class)
    ;
fw_role_attrib_list!:
    (fw_role_attrib)
    ;
fw_class!:
    "MDO"
    |"DO1"
    |"DO2"
    |"DO3"
    |"DO4"
    |"DO5"
    |"DO6"
    ;
fw_role_attrib!:
    "parent"
    |"child1"
    |"child2"
    |"child3"
    |"child21"
    |"child31"
    |"child32"
    ;
}
  #token SEMI ";"
  #token IMPLIES "=>"
  #token LPAREN "("
  #token RPAREN ")"
  #token LBRACKDOWN "["
  #token LBRACKUP "[^"
  #token RBRACK "]"
  #token LCURLY       "{"
  #token RCURLY       "}"
  #token COLON        ":"
  #token COMMA        ","
  #token DOT          "."
  #token STAR         "*"
  #token SCOPEOP      "::"
  #token PLUS         "+"
  #token SPACE "[ tn]+"          <<skip( );>>
  #token IDENT "[a-zA-Z_] [a-zA-Z0-9_/t*]*"
  #token "[ t]+"      <<skip( );>>
  #token "n"          <<skip( ) ; newline( ) ;>>
  #token LANGLEBRACK       "<"
  #token RANGLEBRACK       ">"
  #token METARULEBEGIN     "<<"
  #token METARULEEND       ">>"
  #token LANG              "LANG"
```

As seen from the contents of the above grammar file, the generic framework-independent portion of the grammar file resides above the comment line stating "the following production rules are to be generated." The framework-dependent portion of the grammar file resides below that comment line, which is where repository generator 510 may insert the relevant model information to complete the grammar. Once the grammar is completed, repository generator 510 may then pass the grammar file to a known parser generator (such as ANTLR/PCCTS) to generate rule parser 1510, which may then be incorporated into repository generator 510.

Rule Object Generation

Figure 16:
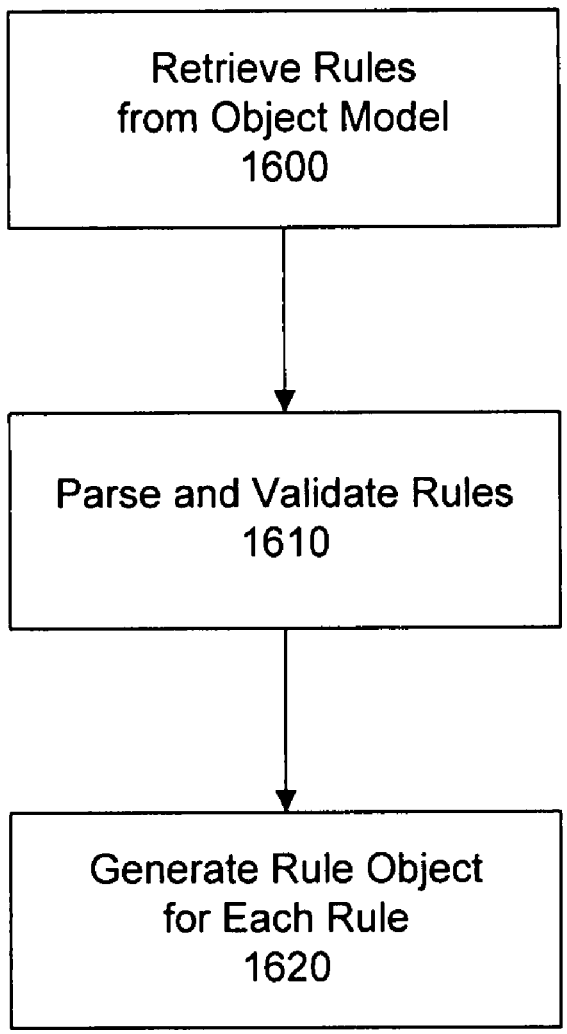
FIG. 16 is a flow chart that depicts a process for generating invalidation rule objects in accordance with an embodiment of the present invention.

As described in FIG. 16, repository generator 510 may then retrieve the invalidation rules from object model 1500 (step 1600), and parse and validate the rules (step 1610). In parsing the rules, rule parser 1510 may check for syntactic correctness of each rule based on the specified object navigation grammar, and check for correctness of class names and role names based on the specified object model 1500. Repository generator 510 may validate the rules, for example, by using object model 1500 to ensure that casting operations and navigation paths are supported by the model, as well as making sure that the rule ends with a main development object type (instead of a development object type) and that the runtime object type to be invalidated is properly associated with the ending main development object type. After the rules are parsed and validated, repository generator 510 may dump them into an XML file for subsequent processing.

Rule Generator 1520 may read the invalidation rules from the XML file and, using XSL transformations, generate for each rule a corresponding rule object (rule objects 1530) to be compiled into repository runtime 1540 (step 1620) of application repository 520. According to one embodiment of the present invention, each rule object is generated with a "navigate" function that:

receives as input a development object (or a reference to the development object) of a type that resides anywhere in the rule's navigation path, navigates using object instances, starting from the received object type's location in the navigation path and proceeding through the subsequent steps of the navigation path, and returns any resultant runtime object (or a reference to the runtime object) of a type required by the rule.

In this manner, the rule object's "navigate" function may be invoked to determine the runtime objects, if any, that are influenced by a changed development object that lies anywhere in the rule's navigation path. The rule object's "navigate" function is overloaded to allow for the input of a development object of any type that is listed in the rule's navigation path.

So that a determination can be made of which development object types are listed in a rule object's associated navigation path, rule generator 1520 generates each rule object with the functionality to provide this information. In addition, each rule object may also be generated with functionality to additionally provide a listing of any influenced runtime object types specified at the end of the rule. This combined functionality could enable an index to be constructed for fast runtime rule determination. For example, assuming rule objects are generated for the RTO1 and RTO2 invalidation rules provided earlier (from the discussion of FIG. 13), the following is a collection of the listings that may be provided by each of the rule objects:

| Rule Object | DO Types | RTO Types |
| --- | --- | --- |
| Rule Object 1 | DO1, MDO | RTO1 |
| Rule Object 2 | DO2, MDO | RTO1 |
| Rule Object 3 | DO3, DO2, MDO | RTO2 |
| Rule Object 4 | DO4, MDO | RTO2 |
| Rule Object 5 | DO5, DO4, MDO | RTO1 |
| Rule Object 6 | DO6, DO4, MDO | RTO2 |

Rule Object 1 corresponds to the rule with starting object type DO1, Rule Object 2 corresponds to the rule with starting object type DO2, etc.

Based on these lists, repository runtime 1540 can generate the following index:

| Changed DO Type | Relevant Rule Objects |
|---|---|
| MDO | 1, 2, 3, 4, 5, 6 |
| DO1 | 1 |
| DO2 | 2, 3 |
| DO3 | 3 |
| DO4 | 4, 5, 6 |
| DO5 | 5 |
| DO6 | 6 |

This index is constructed by matching each development object type with each rule object that lists the development object type in its rule's navigation path. Repository runtime 1540 may use this index during runtime to immediately determine which rule objects' "navigate" function should be invoked when a development object is changed. In an actual development environment with a large number of rules and associated object types, this index can achieve substantial time savings during runtime because it eliminates the need for repository runtime 1540 to check each rule object for its relevance with respect to a development object every time it changes.

Incremental Generation and Selective Server/Local Runtime Object Retrieval

Figure 17:
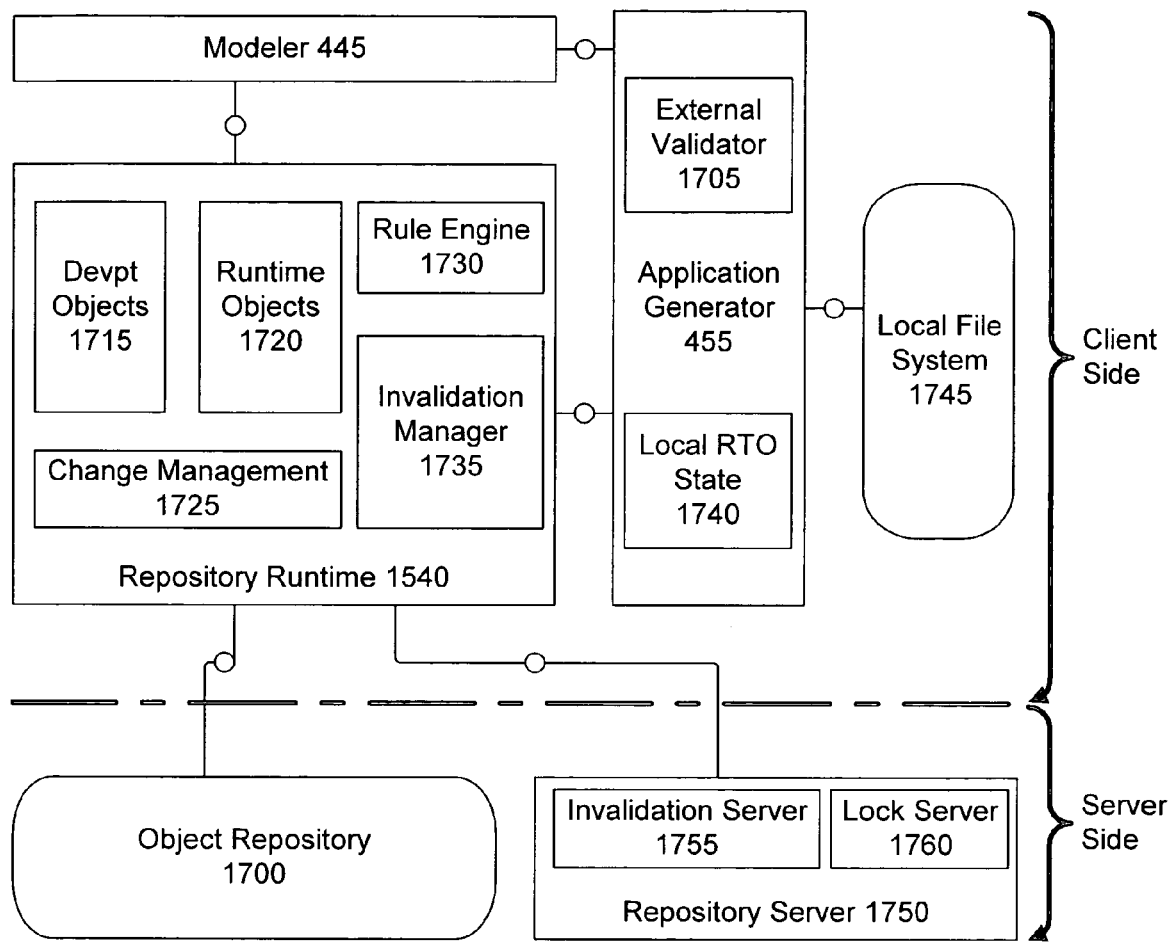
FIG. 17 is a block diagram of a repository based application development environment in accordance with an embodiment of the present invention.

Within a repository based application development environment as illustrated in FIG. 17, an embodiment of the present invention may be implemented to enable application generator 455 to generate (FIG. 20) only those runtime objects that have been invalidated (FIGS. 19, 24) through rule-based navigation. As illustrated below, this embodiment scales to support many client side developers by centrally storing development objects and runtime objects (either baseline version or changelist version) on the server side in object repository 1700, while allowing each developer client to maintain cached copies of these objects locally.

Repository runtime 1540 may include several components, such as development objects 1715, runtime objects 1720, rule engine 1730, rule objects 1530, change management 1725 and invalidation manager 1735, that may implement particular client side functionality of application repository 520. Application generator 455 may similarly include several components, such as local runtime object state 1740 and external validator 1705, that may implement particular functionality in the generation of runtime objects. Repository server 1750 may include several components, such as invalidation server 1755 and lock server 1760, that may implement particular server side functionality of application repository 520.

Figure 18:
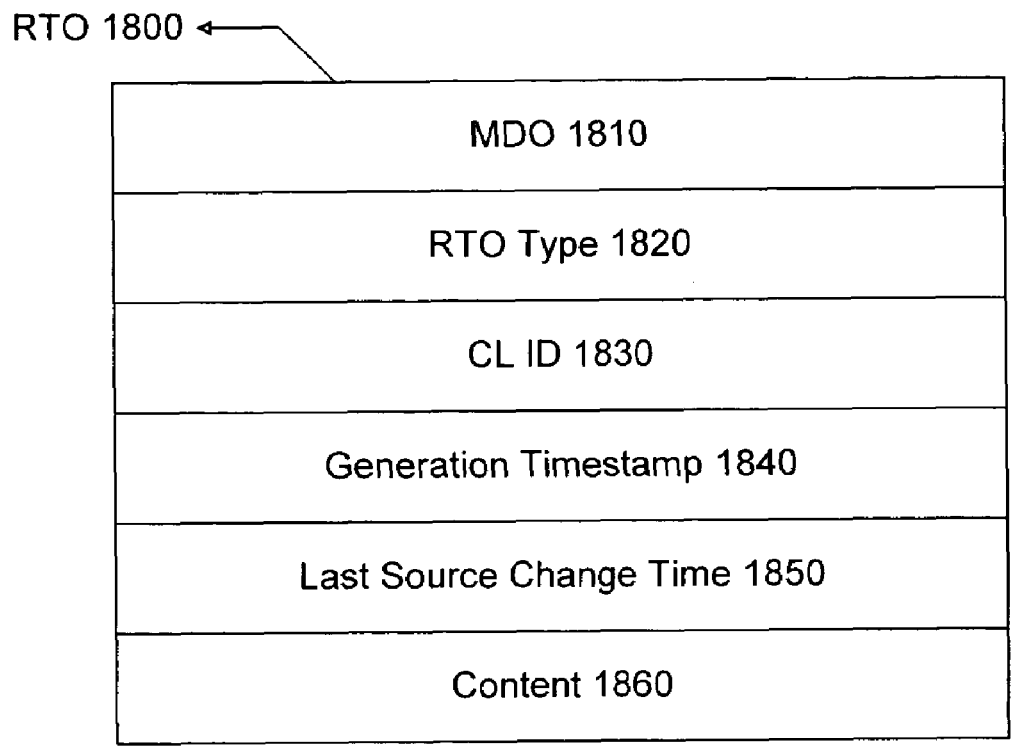
FIG. 18 is a block diagram of a data structure representing a runtime object in accordance with an embodiment of the present invention.

According to this embodiment, application generator 455 initially generates all new development objects into corresponding runtime objects, which are persisted to both local file system 1745 and object repository 1700. These runtime objects may be represented by the RTO 1800 data structure as shown in FIG. 18, which may include MDO 1810, RTO type 1820, CL ID 1830, generation timestamp 1840, last source change time 1850 and content 1860. MDO 1810 may represent the main development object (or pointer thereto) from which the runtime object was generated. RTO type 1820 may represent the runtime object's particular runtime object type. CL ID 1830 may represent an identifier denoting whether the runtime object was generated from a main development object in the baseline or in one of many developer changelists. Generation timestamp 1840 may represent the time that the runtime object was persisted to object repository 1700 after being generated by application generator 455. Last source change time 1850 may represent the most recent time that the main development object from which the runtime object was generated had been changed. And content 1860 may represent the actual content (or pointer thereto) of the runtime object (e.g., class file, binary file, etc.). Thus, a runtime object stored in local file system 1745 and a runtime object stored in object repository 1700 may correspond to each other if they each have the same data elements 1800-1860.

Figure 19:
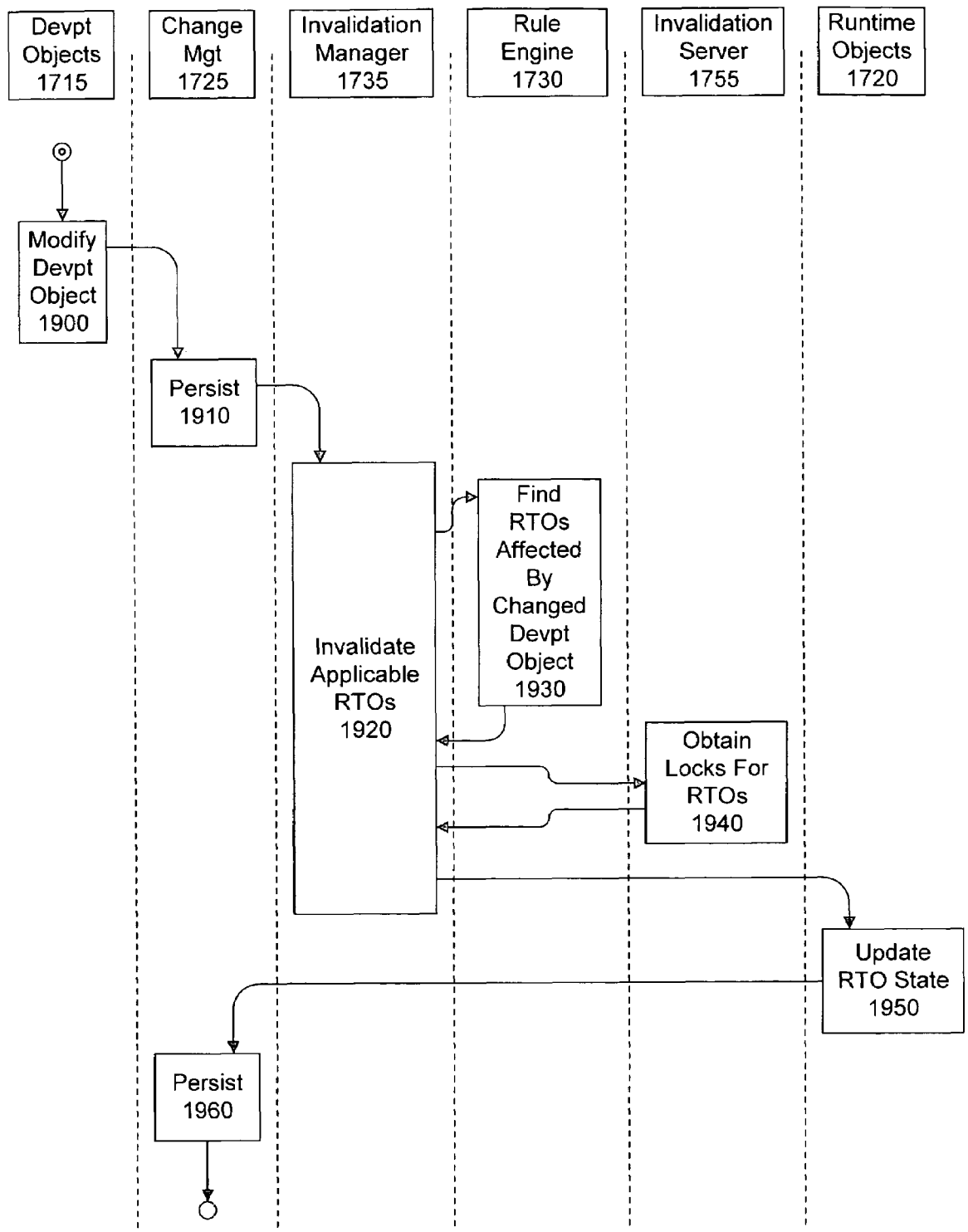
FIG. 19 is a sequence diagram that depicts the flow of a repository based application development environment during invalidation of a development object in accordance with an embodiment of the present invention.

Invalidation of runtime objects may occur when, as illustrated in FIG. 19, an application developer uses modeler 445 to make changes to development objects that are in the developer's changelist (step 1900). When the developer attempts to persist the changed development objects to local file system 1745 (step 1910), invalidation manager 1735 initiates an invalidation process (step 1920) that first determines all runtime objects that may be influenced by the changed development objects (step 1930). This determination may be quickly made through invocation of the "navigate" function of relevant rule objects that are selected from an index, as described above, of changed development object types and relevant rule objects. Once invalidation server 1755 obtains locks from lock server 1760 for accessing the influenced runtime objects in object repository 1700 (step 1940), invalidation manager 1735 invalidates the influenced runtime objects by marking their state as invalid in object repository 1700 (step 1950). Their state may be marked as invalid by updating the last source change time 1850 field of their runtime object data structures. (Instead of the last source change time 1850 field, RTO 1800 may utilize a boolean field that indicates whether the runtime object state is valid (e.g., TRUE) or invalid (e.g., FALSE).) Once this is completed, the changed development object is persisted to local file system 1745 (step 1960). A similar invalidation process may occur when a developer releases the development objects to the baseline, except that the development objects are stored in object repository 1700.

Figure 20:
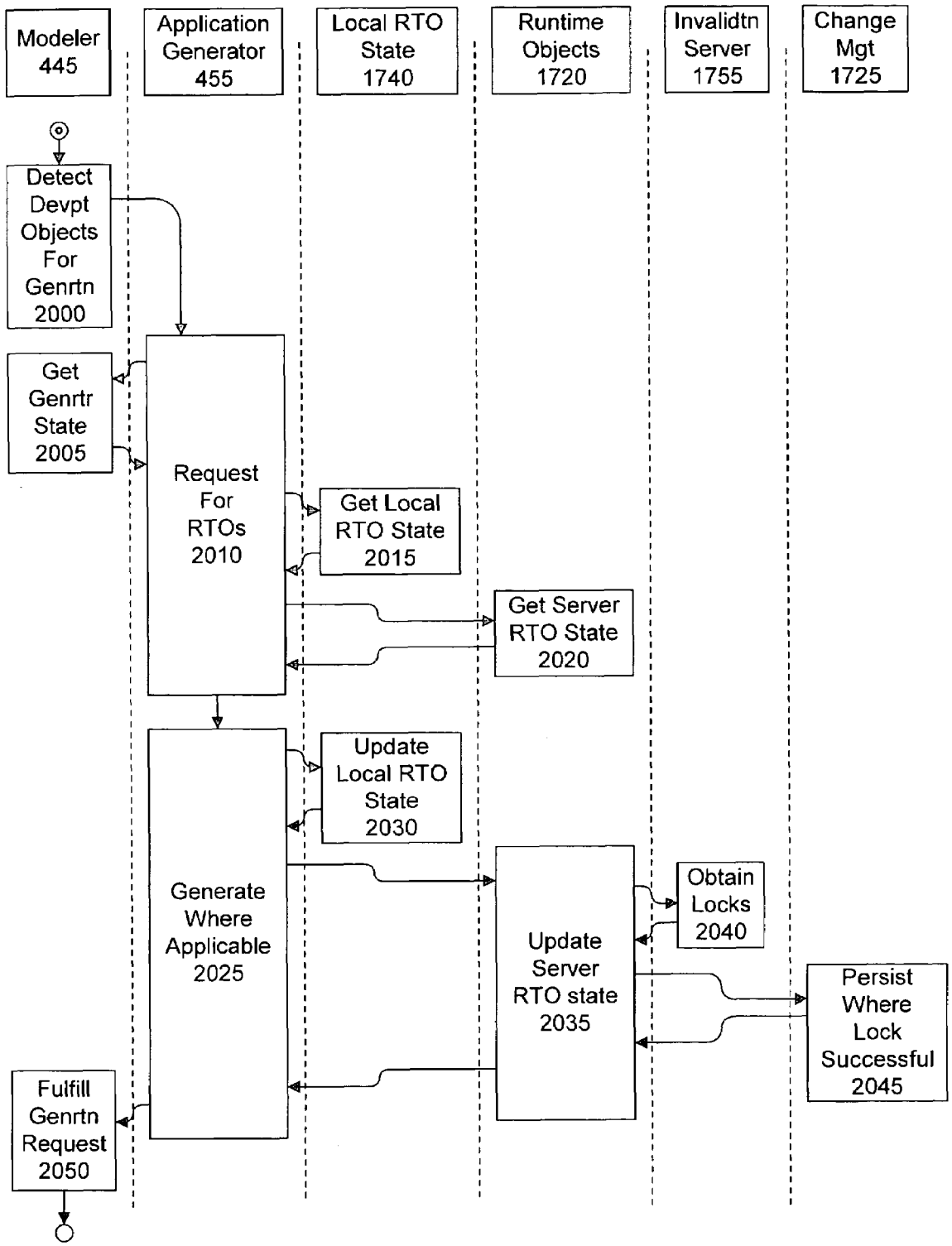
FIG. 20 is a sequence diagram that depicts the flow of a repository based application development environment during generation of a development object in accordance with an embodiment of the present invention.
Figure 21:
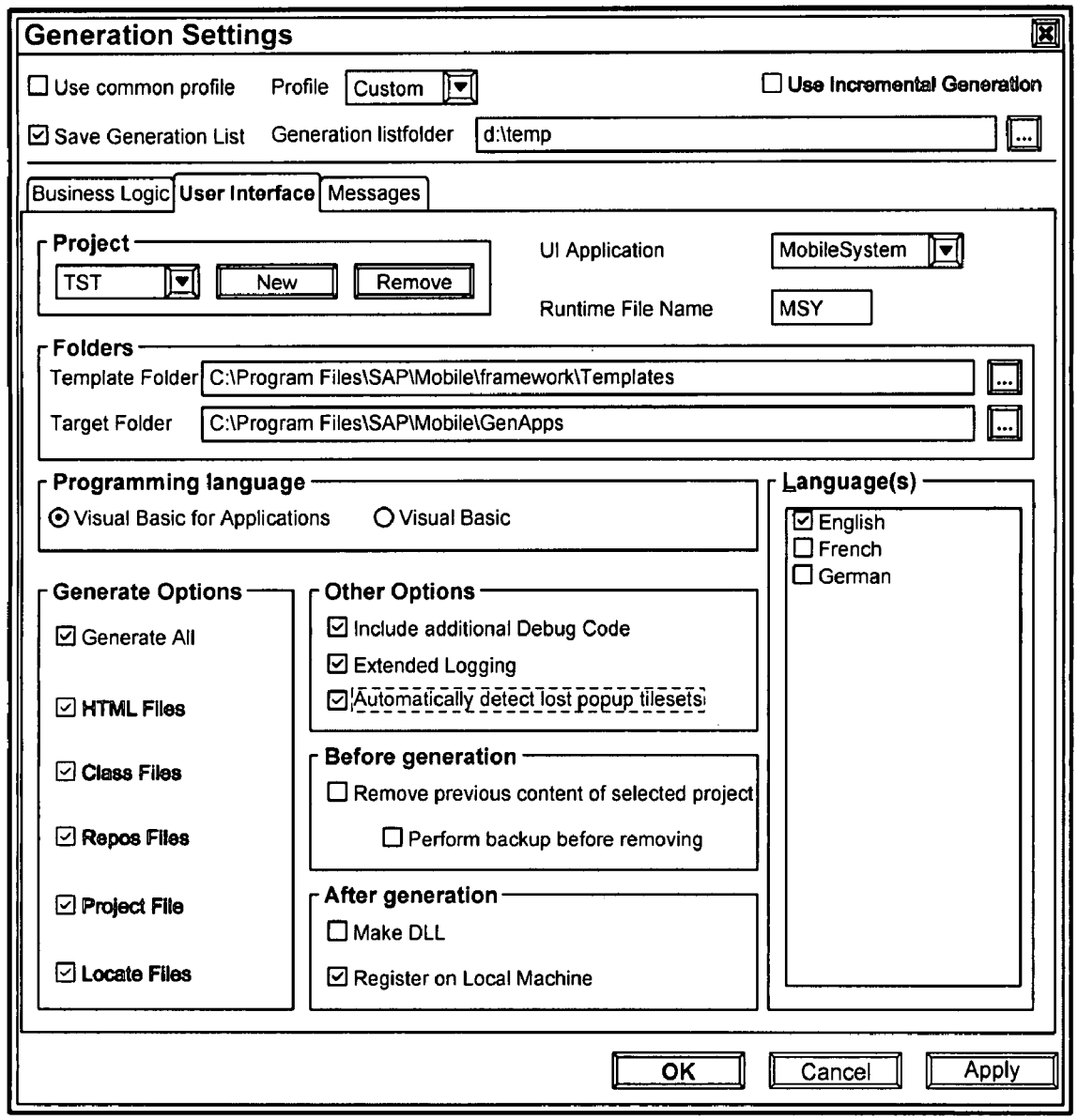
FIG. 21 is a screen shot of a generator settings window in accordance with an embodiment of the present invention.

To improve generator efficiency, only invalidated runtime objects are regenerated, as illustrated in FIG. 20. When an application developer wishes to test changed development objects, for example, the developer may explicitly request, through the user interface of modeler 445, the generation of any corresponding runtime objects. In order to comply with this request, modeler 445 first identifies the development objects that have been changed (step 2000) by looking to the current changelist. Modeler 445 then requests the needed runtime objects from application generator 455 (step 2010) by providing application generator 455 with a list of the current changelist development objects. Application generator 455 determines from this changelist which runtime objects are needed based on the framework object model information and object navigation. Application generator 455 also retrieves from modeler 445 the current generator state (step 2005), which specifies user-selected settings that define how application generator 455 is to generate any runtime objects. FIG. 21 illustrates a generator settings window that a developer may use to define the generator settings.

Next, for each requested runtime object, application generator 455 retrieves the local state of the runtime object (generation timestamp 1840 of local RTO 1800) from the runtime object in local file system 1745 (step 2015), and retrieves the server state of the runtime object (generation timestamp 1840 and last source change time 1850 of the server RTO 1800) from the runtime object in object repository 1700 (step 2020).

If the server state is valid (i.e., the last source change time is not more recent than the generation timestamp), and the server generation timestamp is not more recent than the local generation timestamp, then neither regeneration (step 2025), nor retrieval of the runtime object from object repository 1700 and update of local generation timestamp (step 2030) is necessary because the local runtime object is valid and current. The local runtime object stored in local file system 1745 is then retrieved. Since the local runtime object is already stored in local file system 1745, the local runtime object retrieval may be accomplished simply by making the local runtime object available in modeler 445 for use by the application developer, fulfilling the request (step 2050). Application generator 455 may make the local runtime object available for use by, for example, returning a data element indicating the local runtime object's validity (i.e., a boolean field or generation timestamp 1840). If the server state is valid but the server generation timestamp is more recent than the local generation timestamp, generation is still not necessary (step 2025) but the local runtime object is not current. In this case, application generator 455 retrieves the more recent runtime object from object repository 1700, updates the local generation timestamp with the server generation timestamp 1840 (step 2030), and stores the requested runtime object in local file system 1745 for use by the application developer in modeler 445, fulfilling the request (step 2050). If the server state is invalid (i.e., the last source change time is more recent than the generation timestamp), application generator 455 regenerates the runtime object (step 2025), updates the local generation timestamp (step 2030), and, upon obtaining a lock for the runtime object in object repository 1700 (step 2040), updates the server generation timestamp and the server last source change time (step 2035) and persists the regenerated runtime object in object repository 1700 (step 2045). The requested runtime object is then stored in local file system 1745 and made available for use by the application developer in modeler 445, fulfilling the request (step 2050).

Validation Based On Generator State

The generator state mentioned in step 2005 specifies user-selected settings that define how application generator 455 is to generate any runtime objects. As shown in FIG. 21, two possible settings are listed under the heading "Other Options" and include "Include additional Debug Code" and "Extended Logging". When the "Include additional Debug Code" option is checked, for example, application generator 455 reports all generation messages, such as warnings and informational messages, instead of only the errors. When the "Extended Logging" option is checked, application generator 455 generates a logging call at the beginning and end of each application method, such as "gServices.Log 'Entering method' & MethodName" and "gServices.Log 'Exiting method' & MethodName".

When application generator 455 checks the validity of a server runtime object in step 2020 to determine whether it requires regeneration, application generator 455 looks to the server runtime object's last source change time field in order to determine if the runtime object requires regeneration (i.e., is invalid) due to a change in a development object upon which the runtime object depends. According to another embodiment of the present invention, even if the server runtime object is otherwise valid, application generator 455 (via external validator 1705) may also check whether the server runtime object was last generated according to the current generator state. If not, application generator 455 may regenerate it according to the current generator state.

After application generator 455 determines that the server runtime object is valid in step 2020, when application generator 455 checks the validity of a local runtime object to determine whether it needs update, application generator 455 looks to the local and server runtime objects' generation timestamp 1840 to determine if the local runtime object's generation timestamp 1840 is more recent than the server runtime object's generation timestamp 1840. According to another embodiment of the present invention, before comparing the local runtime object's generation timestamp 1840 to the valid server runtime object's generation timestamp 1840, application generator 455 (via external validator 1705) may also check whether the local runtime object was last generated according to the current generator state. If not, application generator 455 may retrieve the valid server runtime object from object repository 1700 and update the local generation timestamp.

Figure 22:
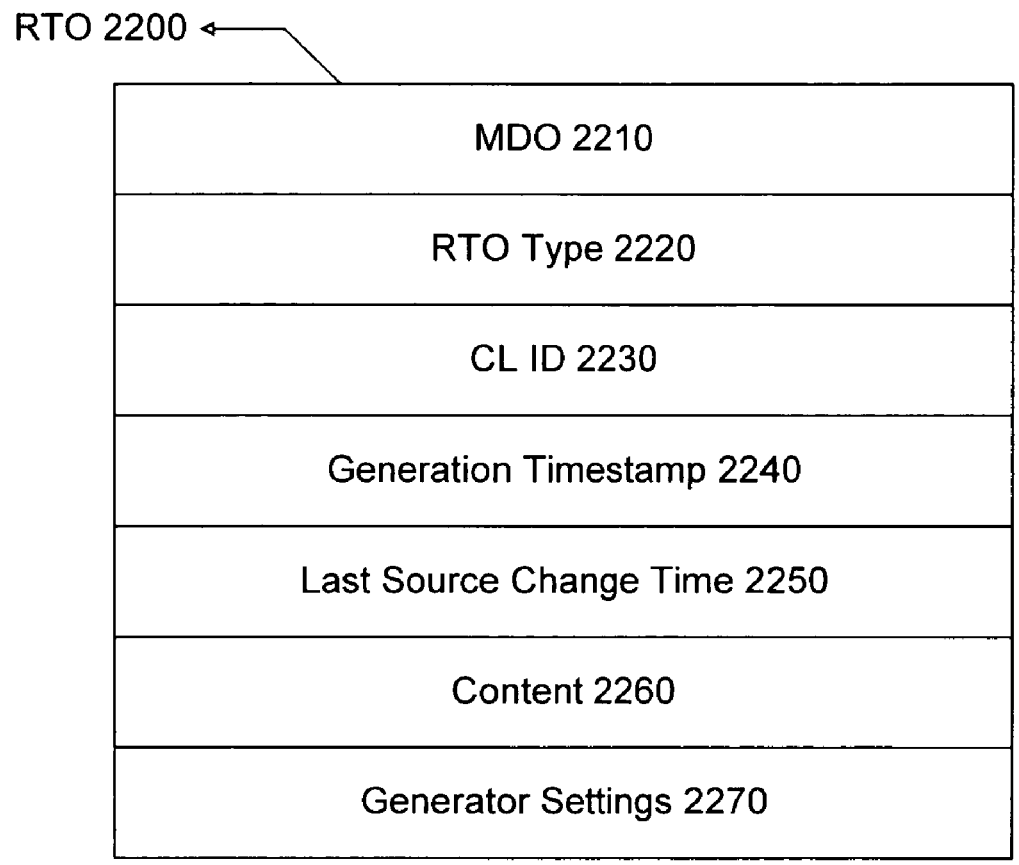
FIG. 22 is a block diagram of a data structure representing a runtime object in accordance with an embodiment of the present invention.

This generator state validation mechanism may be implemented by representing runtime objects, on the local and server side, by the RTO 2200 data structure as shown in FIG. 22. This data structure is identical to the RTO 1800 data structure discussed above, except that RTO 2200 may additionally include the generator state that was employed during the runtime object's last generation. For example, content 2260 may represent the content (or pointer thereto) of RTO 2200 that was generated with the "Include additional Debug Code" generation setting enabled (i.e., checked); generator settings 2270 may represent the "Include additional Debug Code" generation setting. Generator settings 2270 may represent the generator state in any form, including a textual description of the generator settings and/or a hash code corresponding to the textual description of the generator settings. Using such a hash code enables external validator 1705 to quickly compare the current generator state with a generator settings 2270 field in steps 2015 and 2020 during runtime.

Table of Contents

Figure 23:
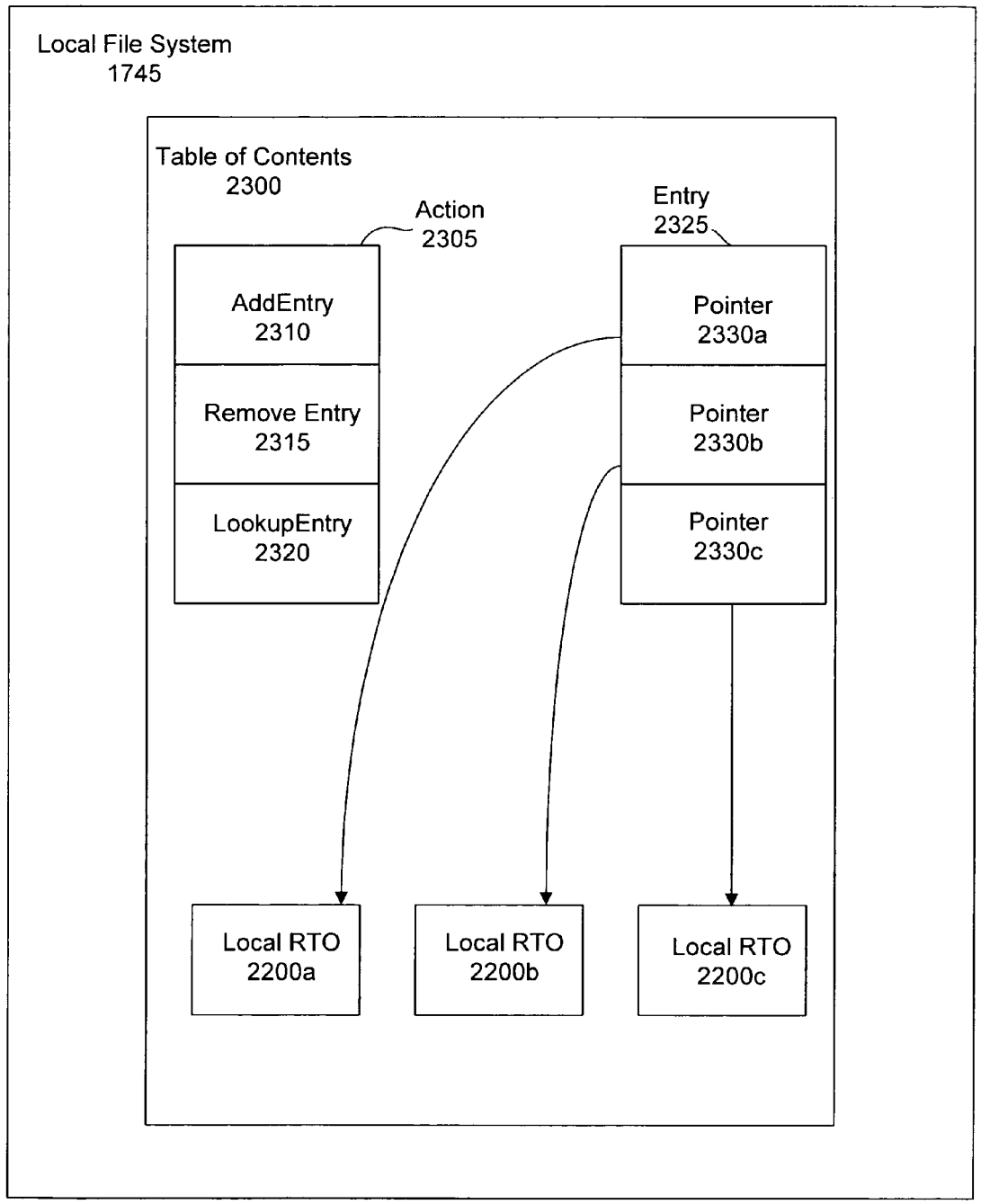
FIG. 23 is a block diagram that depicts a data structure of a local file system for storing runtime objects in accordance with an embodiment of the present invention.

According to an embodiment of the present invention as illustrated in FIG. 23, local file system 1745 may store local runtime objects via table of contents (TOC) 2300. TOC 2300 may include several data structure components, such as action 2305, entry 2325, and several local RTOs 2200*a-c*. Entry 2325 may store a set of pointers 2330*a-c* that may each identify a particular local RTO 2200. For example, pointer 2330*a* may identify local RTO 2200*a*. Action 2305 may store a set of commands that can be performed to manipulate pointers 2330 and by extension the local RTOs 2200 identified by pointers 2330.

For example, modeler 445 may request a runtime object. In response, application generator 455 may use LookupEntry 2320 to determine if there is any pointer 2330 that identifies a local RTO 2200 that has data elements 2210, 2220, 2260, and 2270 that would fulfill the request by Modeler 445. If there is, then application generator 455 can retrieve that local runtime object if its generation timestamp 2240 is not less recent than a corresponding server runtime object's generation timestamp 2240. In a similar manner, if a new RTO 2200 has been locally persisted, application generator 455 may use AddEntry 2310 to store a new pointer 2330 to identify the new RTO 2200, and if a local RTO 2200 has been deleted, application generator 455 may use RemoveEntry 2315 to remove a pointer 2330 that identifies the local RTO 2200 that has been deleted.

CheckSum Validation

Figure 24:
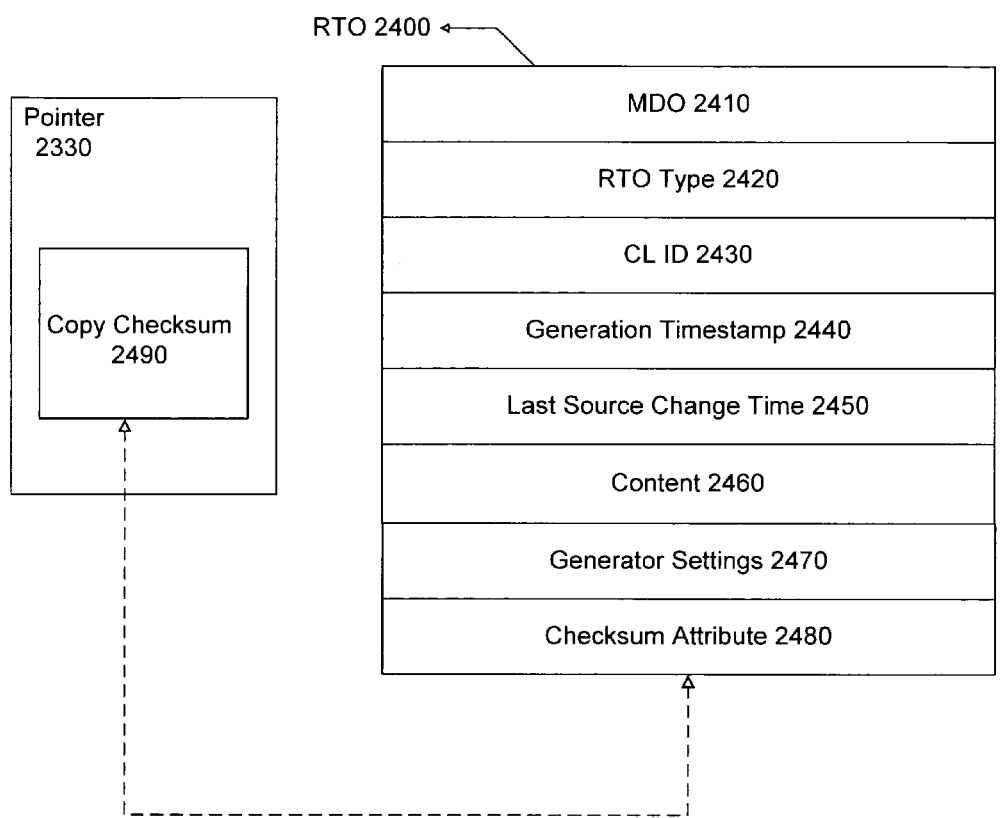
FIG. 24 is a block diagram that depicts a data structure representing a runtime object in accordance with an embodiment of the present invention.

A runtime object that is locally stored may become unusable by the application developer without there having been a change to generator settings and without a changed development object being mapped to the locally stored runtime object, such as when the locally stored runtime object has been manually manipulated. In an embodiment of the present invention as illustrated in FIG. 24, application generator 455 may invalidate a local runtime object that has been subject to distortion by representing local runtime objects by the RTO 2400 data structure. This data structure is identical to the RTO 2200 data structure discussed above, except that RTO 2400 may additionally include checksum attribute 2480. Checksum attribute 2480 may represent a combination of the local runtime object's generator settings 2470 and its content 2460 (or any other combination of data elements 2410-2470). Checksum attribute 2480 may take any form, such as a value, code, or any other data type.

Whenever a runtime object is persisted to local file system 1745, application generator 455 may include in the pointer 2330 that identifies the runtime object a copy checksum 2490 that is equivalent to the identified runtime object's checksum attribute 2480. Then, before making a local RTO 2400 available to the application developer in modeler 445 (step 2050), application generator 455 may regenerate a new checksum attribute 2480 for the local RTO 2400 that is to be returned, and then compare the regenerated local checksum attribute 2480 to the copy checksum 2490 of the pointer 2330 that identifies the local RTO 2400 that is to be returned. The comparison may be implemented by using a simple CRC32 algorithm or any comparison algorithm or calculation. If regenerated checksum attribute 2480 and copy checksum 2490 do not equate, application generator 455 may invalidate the locally stored runtime object. Application generator 455 then retrieves the runtime object from object repository 1700, updates the local generation timestamp with the server generation timestamp 2240, and stores the retrieved runtime object in local file system 1745 for use by the application developer in modeler 445, fulfilling the request.

Distributed Management

Figure 25:
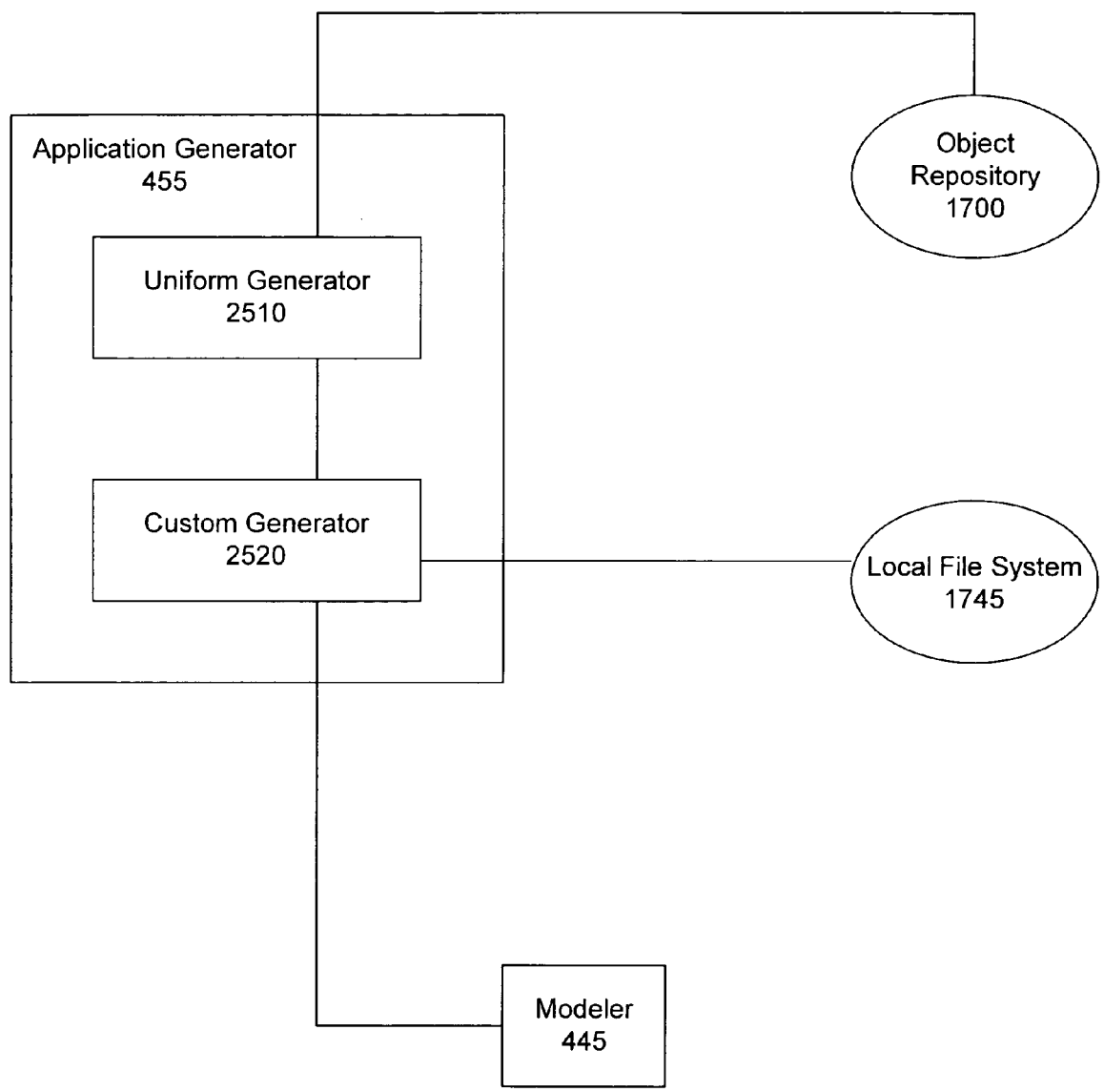
FIG. 25 is a block diagram depicting an arrangement of generator components in accordance with an embodiment of the present invention.

As depicted in FIGS. 17 and 20, application generator 455 has access to local file system 1745 and external validator 1705, receives a request for an RTO (step 2010), performs all generation services (steps 2015-2025), and returns a runtime object to modeler 445. In other embodiments, as depicted in FIG. 25, application generator 455 may be further divided into a uniform generator 2510 that performs application generator 455's generic tasks and a custom generator 2520 that performs application generator 455's tasks germane to the particular modeler 445 and local file system 1745. FIG. 25 represents only one possible schematic of this embodiment. Any number of schematics that distribute the tasks of application generator 455 may be used.

In this particular schematic, custom generator 2520 may receive a request for a runtime object from modeler 445 (step 2010) and may convey that request to uniform generator 2510. Uniform generator 2510 may act as a proxy and perform all processes necessary for determination of runtime object validity and for runtime object generation. For example, uniform generator 2510 may retrieve the server state of a runtime object (step 2020), and then ask custom generator 2520 to retrieve a runtime object from the local file system 1745. Custom generator 2520 may then retrieve a runtime object from local file system 1745 and provide the runtime object to uniform generator 2510. Uniform generator 2510 may then determine whether the generation timestamp 2440 of the runtime object stored in local file system 1745 is less recent than the generation timestamp 2240 of the runtime object stored in object repository 1700. After determining that the runtime object stored in local file system 1745 is valid, uniform generator 2510 may inform custom generator 2520 of the local runtime object's validity. Custom generator 2520 may then perform a checksum validation discussed above and may subsequently make the local runtime object available in modeler 445 for use by the application developer, fulfilling the request (step 2050).

Locking

Figure 26:
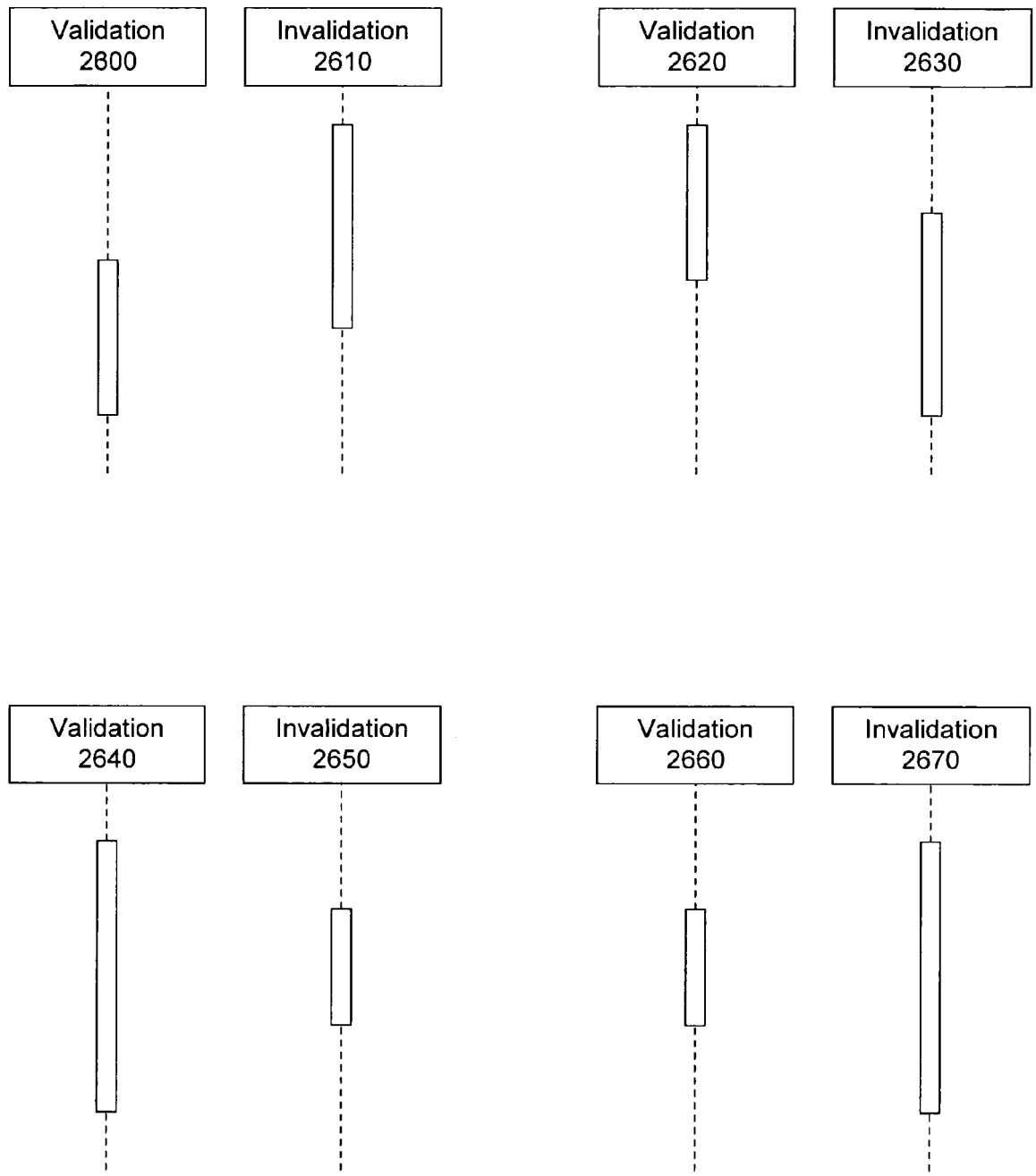
FIG. 26 is a diagram that depicts interfering validation/invalidation processes in accordance with an embodiment of the present invention.

According to the embodiments illustrated in FIGS. 19 and 20, in order to invalidate (step 1950) and validate (step 2045) runtime objects, invalidation server 1755 first obtains locks from lock server 1760 (steps 1940 and 2040, respectively) in order to proceed with the corresponding invalidation/validation. When invalidation and validation requests interfere with each other, as depicted by the request lifetime bars in FIG. 26, the later request fails to obtain a lock from lock server 1760, causing the request to block (i.e., wait) until the earlier request has completed. For example, validation 2600 is blocked by invalidation 2610 because invalidation 2610 secured the appropriate lock first. Similarly, invalidation 2630, invalidation 2650 and validation 2660 all have to block based on the embodiments according to FIGS. 19 and 20.

Figure 27:
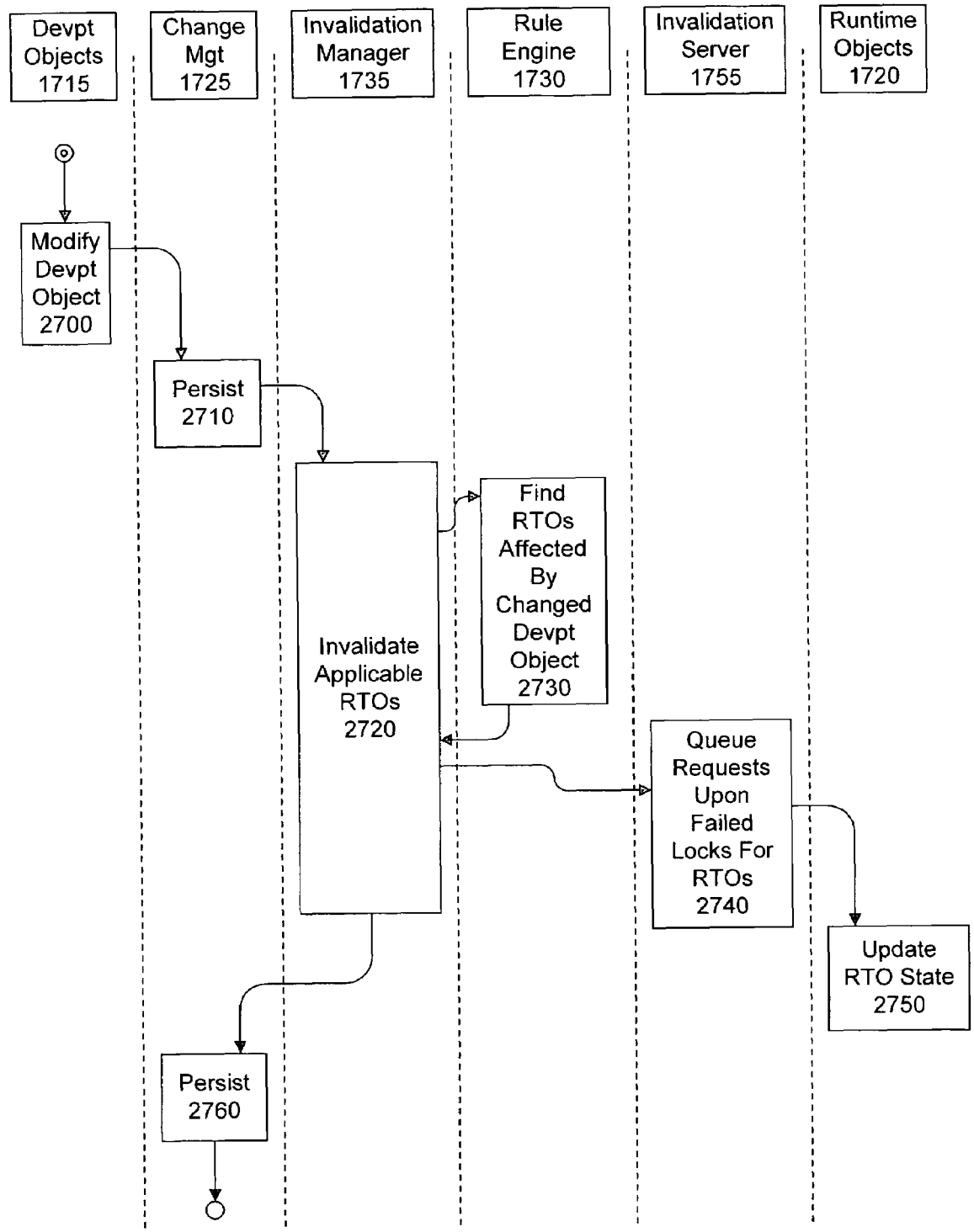
FIG. 27 is a sequence diagram that depicts the flow of a repository based application development environment during invalidation of a development object in accordance with an embodiment of the present invention.

FIG. 27 illustrates an embodiment of the present invention that prevents such blocking by queuing invalidation requests for later processing when the invalidation requests intersect validation requests. To illustrate, validation steps 2700, 2710, 2720 and 2730 of FIG. 27 mirror validation steps 1900, 1910, 1920 and 1930 of FIG. 19. However, in step 1940 invalidation server 1755 blocks until it obtains locks from lock server 1760 (step 1940) to update the runtime object state. In step 2740, on the other hand, when invalidation server 1755 fails to obtain locks from lock server 1760 due to an interfering request, it queues the invalidation request (step 2740) and informs invalidation manager 1735 that the request has been queued. The changed development object then proceeds to be persisted to local file system 1745 (step 2760) without the server runtime object state updated. Once the interfering request is complete, invalidation server 1755 obtains a lock for the queued invalidation request and proceeds to update the runtime object state (step 2750).

The queuing of server invalidation requests preserves the integrity of the server runtime object state, since the invalidation requests are not discarded and eventually invalidate all influenced runtime objects on the server. Server validation requests, on the other hand, may be discarded to prevent blocking, since the server runtime object would still correctly reflect that the runtime object is outdated (causing another generation at the next validation request). In each of these situations, the server runtime object state correctly indicates the server runtime object state.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer system for selectively retrieving runtime objects in an application development environment, comprising:

a first memory unit storing a plurality of server runtime objects; and a second memory unit storing a plurality of local runtime objects, each local runtime object including a generation setting set prior to the respective local runtime object's generation and indicating a manner according to which the respective local runtime object's generation was to have been conducted; and a processor responsive to a request for a requested runtime object by being configured to retrieve a valid copy of the requested runtime object from the plurality of local runtime objects if therein, and to otherwise retrieve the valid copy of the requested runtime object from the plurality of server runtime objects if therein;

wherein the processor is configured to invalidate a local runtime object when the local runtime object's generation setting does not match a current generation setting.

2. The system of claim 1, wherein the processor is configured to retrieve the local runtime object by returning a data element indicating the requested local runtime object's validity.

3. The system of claim 1, further comprising a local database including a first data structure and a second data structure, the second data structure configured to store a plurality of pointers, at least one pointer configured to identify a local runtime object from the plurality of local runtime objects, the first data structure configured to store a plurality of commands, the commands configured to manipulate the second data structure.

4. A computer system for selectively retrieving runtime objects in an application development environment, comprising:

a server database configured to store a plurality of server runtime objects;

a local database configured to store a plurality of local runtime objects; and a generator component configured to include a first generator and a second generator, each provided in communication with each other and the server and local databases, the generator component configured to invalidate and validate server and local runtime objects, to retrieve a requested one of the server and local runtime objects, and to regenerate the requested runtime object conditional upon the retrieved runtime object's invalidity, the first generator configured to perform a first portion of the generator component's tasks, the second generator configured to perform a second portion of the generator component's tasks.

5. A computer system for retrieving stored runtime objects in an application development environment, comprising:

a local database to store a plurality of pointers and a plurality of local runtime objects, at least one local runtime object from the plurality of local runtime objects including a content, a state, and an original checksum attribute, the original checksum attribute configured to represent a combination of the content and the state of the local runtime object with which the original checksum attribute is associated, at least one pointer configured to identify, from the plurality of local runtime objects, a local runtime object including an original checksum attribute, the at least one pointer configured to include a copy of the original checksum attribute associated with the local runtime object that the at least one pointer is configured to identify; and a generator component to, in response to a request for a local runtime object:

calculate a new checksum attribute associated with the requested local runtime object, compare the requested local runtime object's new checksum attribute to its pointer's copy of the original checksum attribute, invalidate the requested local runtime object when the new checksum attribute and the copy of the original checksum attribute do not match, and retrieve the requested local runtime object if the requested local runtime object remains valid.

6. A computer system for selectively retrieving runtime objects in an application development environment, comprising:

a server database configured to store a plurality of server runtime objects;

a local database configured to store a plurality of local runtime objects, each local runtime object from the plurality of local runtime objects configured to correspond to one server runtime object from the plurality of server runtime objects; and a generator component responsive to a request for a requested runtime object by being configured to:

determine if the plurality of server runtime objects includes a valid copy of the requested runtime object;

if it is determined that the plurality of server runtime objects includes the copy of the requested runtime object, determine if the plurality of local runtime objects includes a runtime object that corresponds to the valid copy of the requested runtime object; and retrieve the requested runtime object from the plurality of local runtime objects if it is determined that the plurality of local runtime objects includes the runtime object that corresponds to the valid copy of the requested runtime object, and to retrieve the valid copy of the requested runtime object from the plurality of server runtime objects otherwise, if therein.

7. The system of claim 6, wherein at least one local runtime object from the plurality of local runtime objects and at least one server runtime object from the plurality of server runtime objects contain a content attributes and a state attributes, and wherein the each local runtime object corresponds to the one server runtime object when the each local runtime object's content attributes and state attributes match the one server runtime object's content attributes and state attributes.

8. A computer-implemented method for selectively retrieving runtime objects in an application development environment, comprising:

storing a plurality of server runtime objects;

storing a plurality of local runtime objects, each local runtime object including a generation setting set prior to the respective local runtime object's generation and indicating a manner according to which the respective local runtime object's generation was to have been conducted;

responding to a request for a requested runtime object by retrieving a valid copy of the requested runtime object from the plurality of local runtime objects if therein, and otherwise by retrieving the valid copy of the requested runtime object from the plurality of server runtime objects if therein; and invalidating a local runtime object when the local runtime object's generation setting does not match a current generation setting.

9. The method of claim 8, wherein the local runtime object is retrieved by returning a data element indicating the requested local runtime object's validity.

10. The method of claim 8, further comprising:

storing a plurality of pointers, at least one pointer identifying a local runtime object from the plurality of local runtime objects; and storing a plurality of commands, the commands manipulating the plurality of pointers.

11. A computer-implemented method for retrieving runtime objects in an application development environment, comprising:
    storing a plurality of pointers;
    storing a plurality of local runtime objects, at least one local runtime object from the plurality of local runtime objects including a content, a state, and an original checksum attribute,
        the original checksum attribute representing a combination of the content and the state of the local runtime object with which the original checksum attribute is associated,
        at least one pointer identifying, from the plurality of local runtime objects, a local runtime object including an original checksum attribute,
        the at least one pointer including a copy of the original checksum attribute associated with the local runtime object that the at least one pointer identifies; and
        responding to a request for a local runtime object by:
        calculating a new checksum attribute associated with the requested local runtime object,
        comparing the requested local runtime object's new checksum attribute to its pointer's copy of the original checksum attribute,
        invalidating the requested local runtime object when the new checksum attribute and the copy of the original checksum attribute do not match, and
        retrieving the requested local runtime object if the requested local runtime object remains valid.

12. A computer-implemented method for selectively retrieving runtime objects in an application development environment, comprising:
    storing a plurality of server runtime objects;
    storing a plurality of local runtime objects, each local runtime object from the plurality of local runtime objects capable of corresponding to one server runtime object from the plurality of server runtime objects; and
    responding to a request for a requested runtime object by:
        determining if the plurality of server runtime objects includes a valid copy of the requested runtime object;
        if it is determined that the plurality of server runtime objects includes the copy of the requested runtime object, determining if the plurality of local runtime objects includes a runtime object that corresponds to the valid copy of the requested runtime object; and
        retrieving the requested runtime object from the plurality of local runtime objects if it is determined that the plurality of local runtime objects includes the runtime object that corresponds to the valid copy of the requested runtime object, and by retrieving the valid copy of the requested runtime object from the plurality of server runtime objects otherwise, if therein.

13. The method of claim 12,
    wherein at least one local runtime object from the plurality of local runtime objects and at least one server runtime object from the plurality of server runtime objects contain a content attributes and a state attributes, and
    wherein the each local runtime object corresponds to the one server runtime object when the each local runtime object's content attributes and state attributes match the one server runtime object's content attributes and state attributes.

14. A computer system for selectively retrieving runtime objects in an application development environment, comprising:
    a first memory unit storing a plurality of server runtime objects; and
    a second memory unit storing a plurality of local runtime objects generated based on corresponding server runtime objects, each local runtime object including a respective identification of one of a plurality of generation settings, the identified generation setting being associated with the generation of the respective local runtime object; and
    a processor configured to respond to a request for a requested runtime object by retrieving a valid copy of the requested runtime object from the plurality of local runtime objects if therein, and to otherwise retrieve the valid copy of the requested runtime object from the plurality of server runtime objects if therein.

* * * * *